US012276445B2

(12) United States Patent
Pahwa et al.

(10) Patent No.: US 12,276,445 B2
(45) Date of Patent: Apr. 15, 2025

(54) SPLIT LEVEL SORPTION REFRIGERATION SYSTEM

(71) Applicant: BRY AIR [ASIA] PVT. LTD., Delhi (IN)

(72) Inventors: Deepak Pahwa, Delhi (IN); Bidyut Baran Saha, Fukuoka (JP); Kyaw Thu, Sinagpore (SG); Rajan Sachdev, Delhi (IN); Kuldeep Singh Malik, New Delhi (IN)

(73) Assignee: BRY-AIR [ASIA] PVT. LTD., Delhi (IN)

( * ) Notice: Subject to any disclaimer, the term of this patent is extended or adjusted under 35 U.S.C. 154(b) by 545 days.

(21) Appl. No.: 15/542,496

(22) PCT Filed: Jan. 6, 2016

(86) PCT No.: PCT/IN2016/000007
§ 371 (c)(1),
(2) Date: Jul. 10, 2017

(87) PCT Pub. No.: WO2016/110871
PCT Pub. Date: Jul. 14, 2016

(65) Prior Publication Data
US 2018/0283744 A1    Oct. 4, 2018

(30) Foreign Application Priority Data

Jan. 8, 2015    (IN) ............................... 68/DEL/2015

(51) Int. Cl.
*F25B 25/02*    (2006.01)
*F24F 5/00*    (2006.01)
(Continued)

(52) U.S. Cl.
CPC ............ *F25B 25/02* (2013.01); *F24F 5/0014* (2013.01); *F25B 31/00* (2013.01); *F25B 37/00* (2013.01);
(Continued)

(58) Field of Classification Search
CPC .......... F25B 25/02; F25B 39/00; F25B 37/00; F25B 5/0014; F25B 39/026; F25B 17/08; F25B 17/02; B60H 1/3201
See application file for complete search history.

(56) References Cited

U.S. PATENT DOCUMENTS 4,341,088 A * 7/1982 Mei ...................... B60H 1/3201
62/239
4,881,376 A * 11/1989 Yonezawa ............. F25B 17/083
62/106
(Continued)

FOREIGN PATENT DOCUMENTS

DE    31 42 280    12/1982
EP    0 789 201    8/1997
(Continued)

OTHER PUBLICATIONS

International Search Report for PCT/IN2016/000007 mailed Jul. 8, 2016, 9 pages.
(Continued)

*Primary Examiner* — Kun Kai Ma
(74) *Attorney, Agent, or Firm* — Nixon & Vanderhye, PC

(57) ABSTRACT

The present invention relates to a novel split level sorption refrigeration system. In particular, the present invention provides a split level sorption based unit as a novel method of using the traditional sorption based refrigeration unit. The present invention offers orientation free configuration with efficient cooling power delivery to the various cooling load
(Continued)

locations which is achieved by splitting the evaporator of the sorption chiller from the sorption beds and the condenser.

20 Claims, 33 Drawing Sheets

(51) Int. Cl.
    *F25B 31/00*     (2006.01)
    *F25B 37/00*     (2006.01)
    *F25B 39/00*     (2006.01)
    *F25B 39/02*     (2006.01)

(52) U.S. Cl.
    CPC .............. *F25B 39/00* (2013.01); *F25B 39/02* (2013.01); *F25B 2339/021* (2013.01)

(56) References Cited

U.S. PATENT DOCUMENTS

| | | | |
|---|---|---|---|
| 5,732,569 A * | 3/1998 | Sanada | F25B 17/083 62/480 |
| 8,590,153 B2 | 11/2013 | Mittelbach et al. | |
| 2002/0029579 A1 | 3/2002 | Sohn et al. | |
| 2006/0042290 A1 | 3/2006 | Dai et al. | |
| 2008/0083231 A1 * | 4/2008 | Wang | F24F 3/14 62/93 |
| 2008/0196840 A1 * | 8/2008 | Fukuoka | C08G 63/785 159/13.3 |
| 2008/0307814 A1 * | 12/2008 | Matsui | F24F 6/00 62/238.3 |
| 2012/0216563 A1 | 8/2012 | Braunschweig et al. | |
| 2013/0014538 A1 | 1/2013 | Garner | |
| 2013/0192281 A1 * | 8/2013 | Nam | B60H 1/3201 62/101 |
| 2015/0192309 A1 | 7/2015 | Frolov | |

FOREIGN PATENT DOCUMENTS

| | | | |
|---|---|---|---|
| JP | 2005241109 A | * | 9/2005 |
| JP | 2005-291528 | | 10/2005 |
| WO | WO 2012/085605 | | 6/2012 |

OTHER PUBLICATIONS

Written Opinion of the ISA for PCT/IN2016/000007 mailed Jul. 8, 2016, 13 pages.

* cited by examiner

TYPICAL VAPOUR COMPRESSION UNIT

TYPICAL ADSORPTION COOLING UNIT

TYPICAL ABSORPTION CHILLER UNIT**

TYPICAL HYBRID VAPOUR COMPRESSION UNIT/ADSORPTION COOLING UNIT

ANOTHER TYPICAL HYBRID VAPOUR COMPRESSION UNIT/ADSORPTION COOLING UNIT

TYPICAL HYBRID VAPOUR COMPRESSION UNIT/ABSORPTION COOLING UNIT

TYPICAL SPLIT VAPOUR COMPRESSION UNIT

Figure:- 6
Block Diagram of Inventive Concept
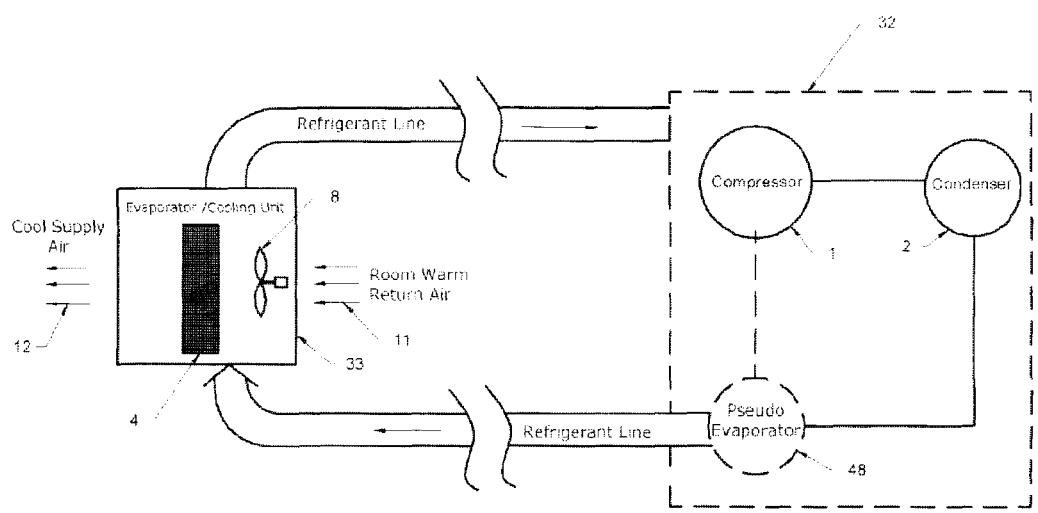

ADSORPTION COOLING WITH THE EVAPORATOR AND
EVAPORATOR TUBES HOUSED IN A REMOTE / INDOOR UNIT

THE SPLIT TECHNOLOGY OF THE INVENTION WHEN
APPLIED TO AN ADSORPTION COOLING

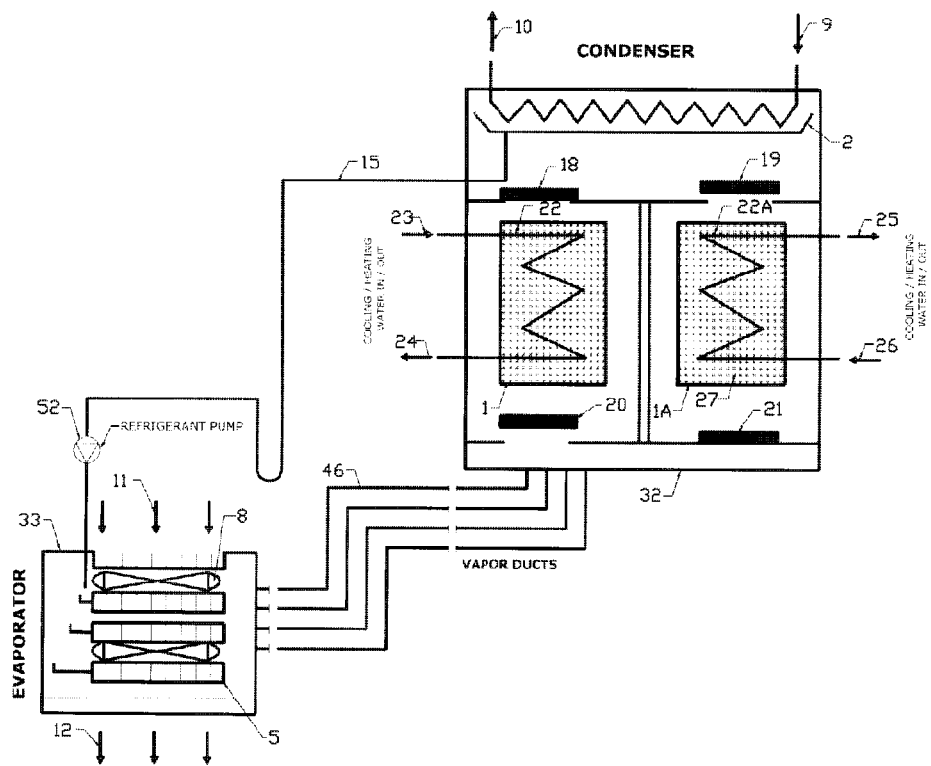
FIGURE 7a (ii)
THE SPLIT TECHNOLOGY OF THE INVENTION WHEN
APPLIED TO AN ADSORPTION COOLING

FIGURE 7a (iii)
THE SPLIT TECHNOLOGY OF THE INVENTION WHEN
APPLIED TO AN ADSORPTION COOLING
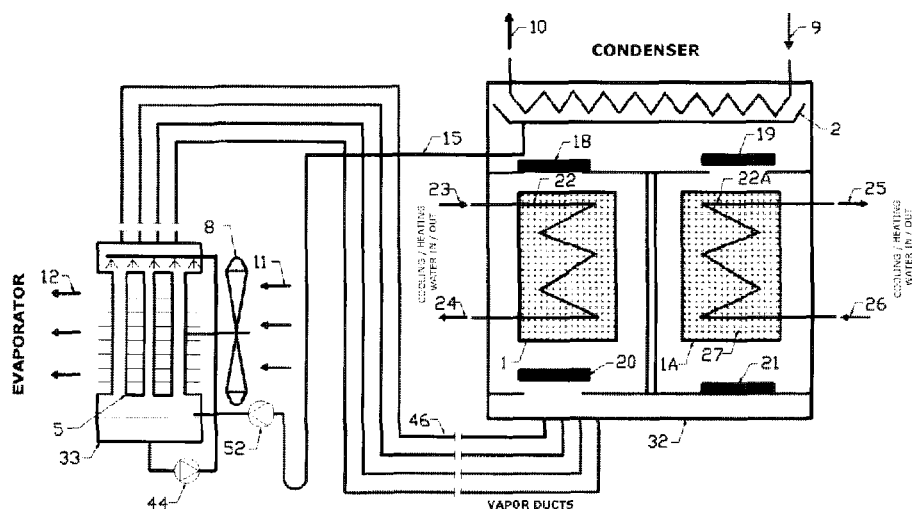

SPLIT TECHNOLOGY OF THE INVENTION WHEN APPLIED TO ADSORPTION COOLING - PSEUDO EVAPORATOR EMBODIMENT

ABSORPTION COOLING / AIR CONDITIONING UNIT

CURRENT INVENTION WITH THE EVAPORATOR AND
EVAPORATOR TUBES HOUSED IN A REMOTE / INDOOR UNIT

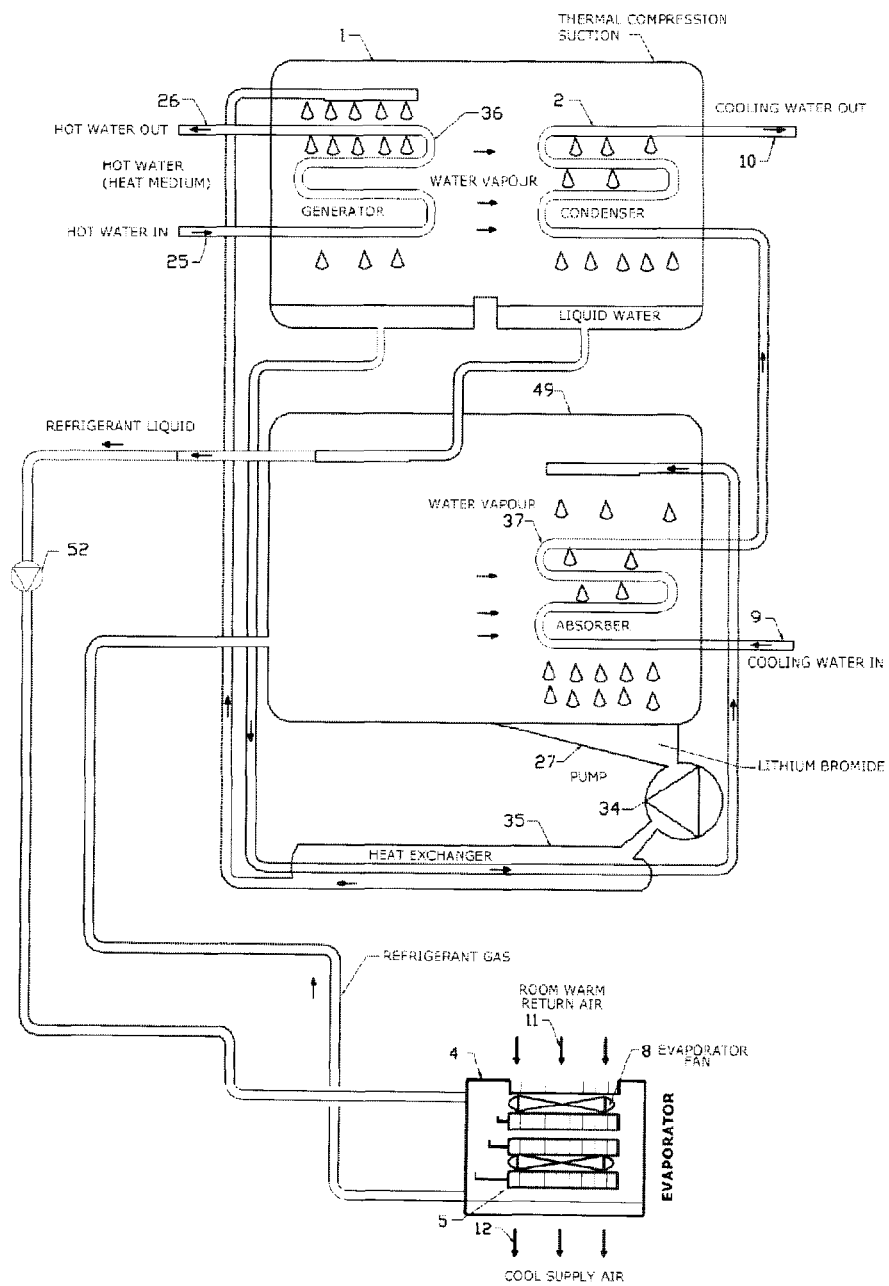

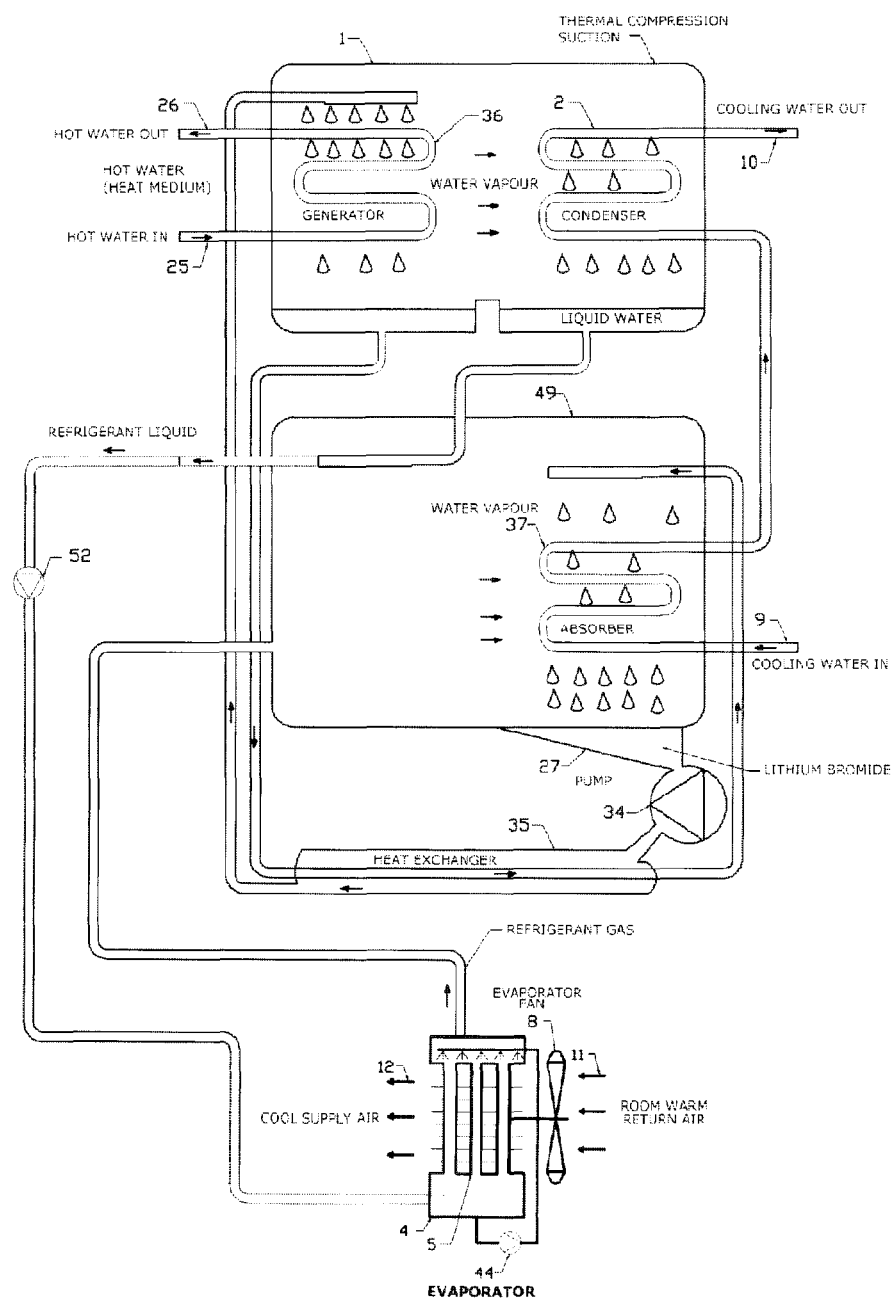
FIGURE 8a(iii)
CURRENT INVENTION WITH THE EVAPORATOR AND
EVAPORATOR TUBES HOUSED IN A REMOTE / INDOOR UNIT

ABSORPTION COOLING / AIR CONDITIONING UNIT

TYPICAL HYBRID VAPOUR COMPRESSION UNIT/ADSORPTION COOLING UNIT

TYPICAL HYBRID VAPOUR COMPRESSION UNIT/ADSORPTION COOLING UNIT

FIGURE 9a (ii)
TYPICAL HYBRID VAPOUR COMPRESSION UNIT/ADSORPTION COOLING UNIT
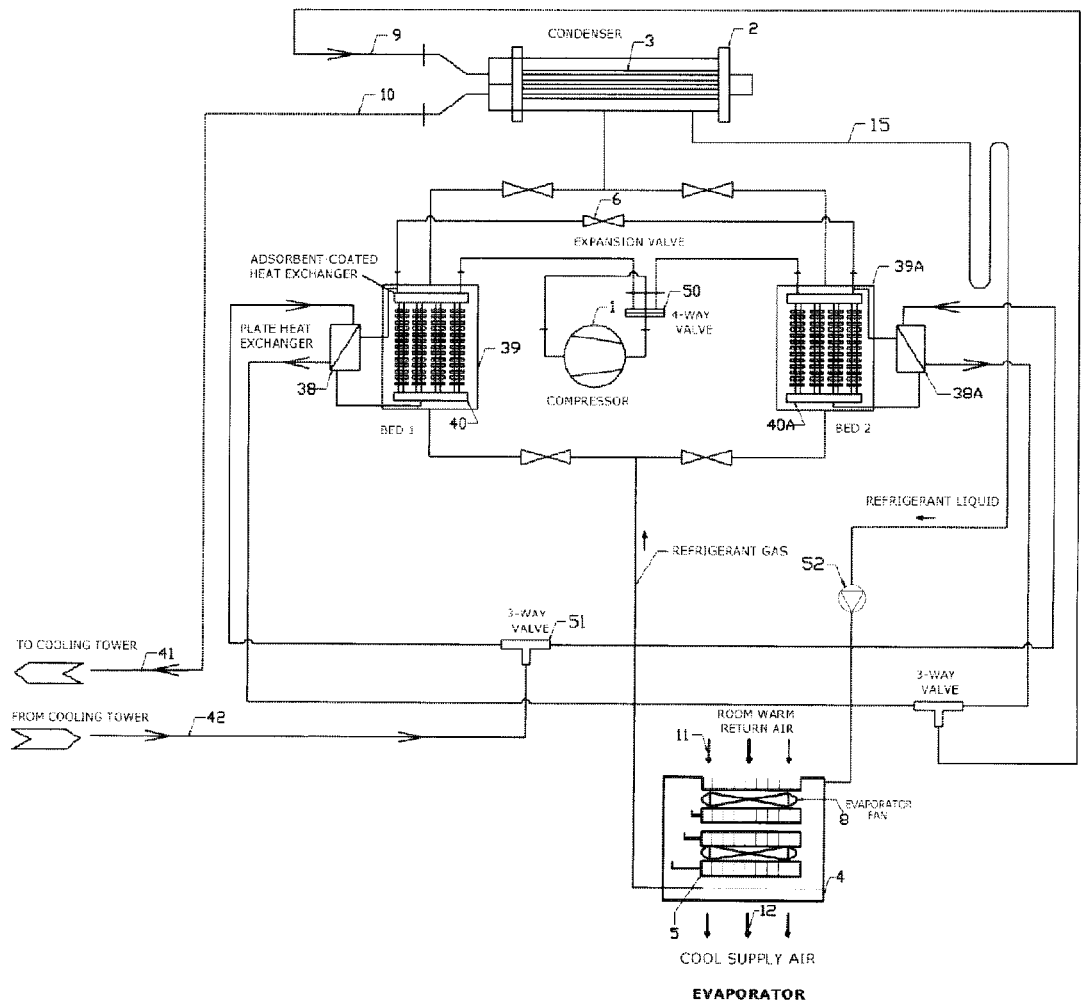

FIGURE 9a (iii)
TYPICAL HYBRID VAPOUR COMPRESSION UNIT/ADSORPTION COOLING UNIT
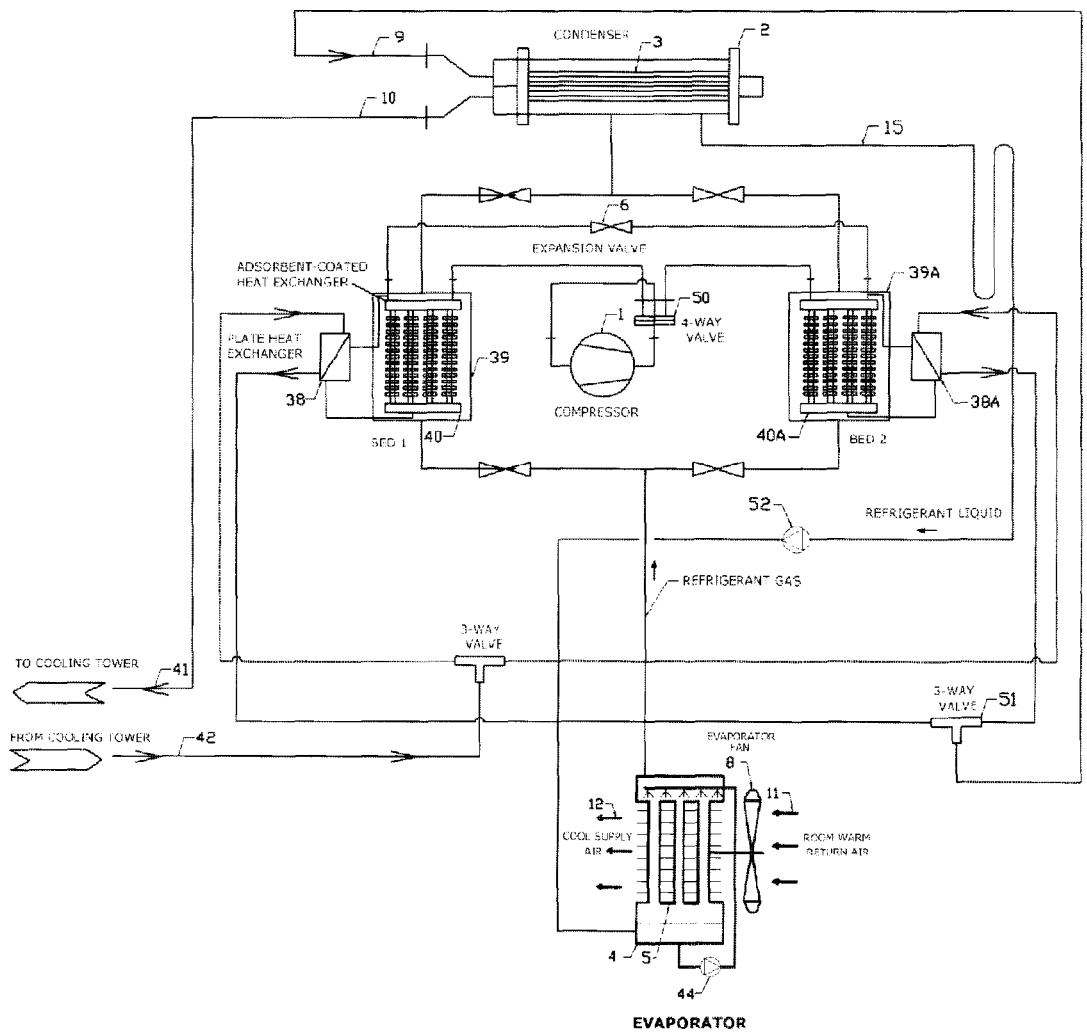

TYPICAL HYBRID VAPOUR COMPRESSION UNIT/ADSORPTION COOLING UNIT

ANOTHER TYPICAL HYBRID VAPOUR COMPRESSION UNIT/ADSORPTION COOLING UNIT

ANOTHER TYPICAL HYBRID VAPOUR COMPRESSION UNIT/ADSORPTION COOLING UNIT

FIGURE 10a (ii)
ANOTHER TYPICAL HYBRID VAPOUR COMPRESSION UNIT/ADSORPTION COOLING UNIT
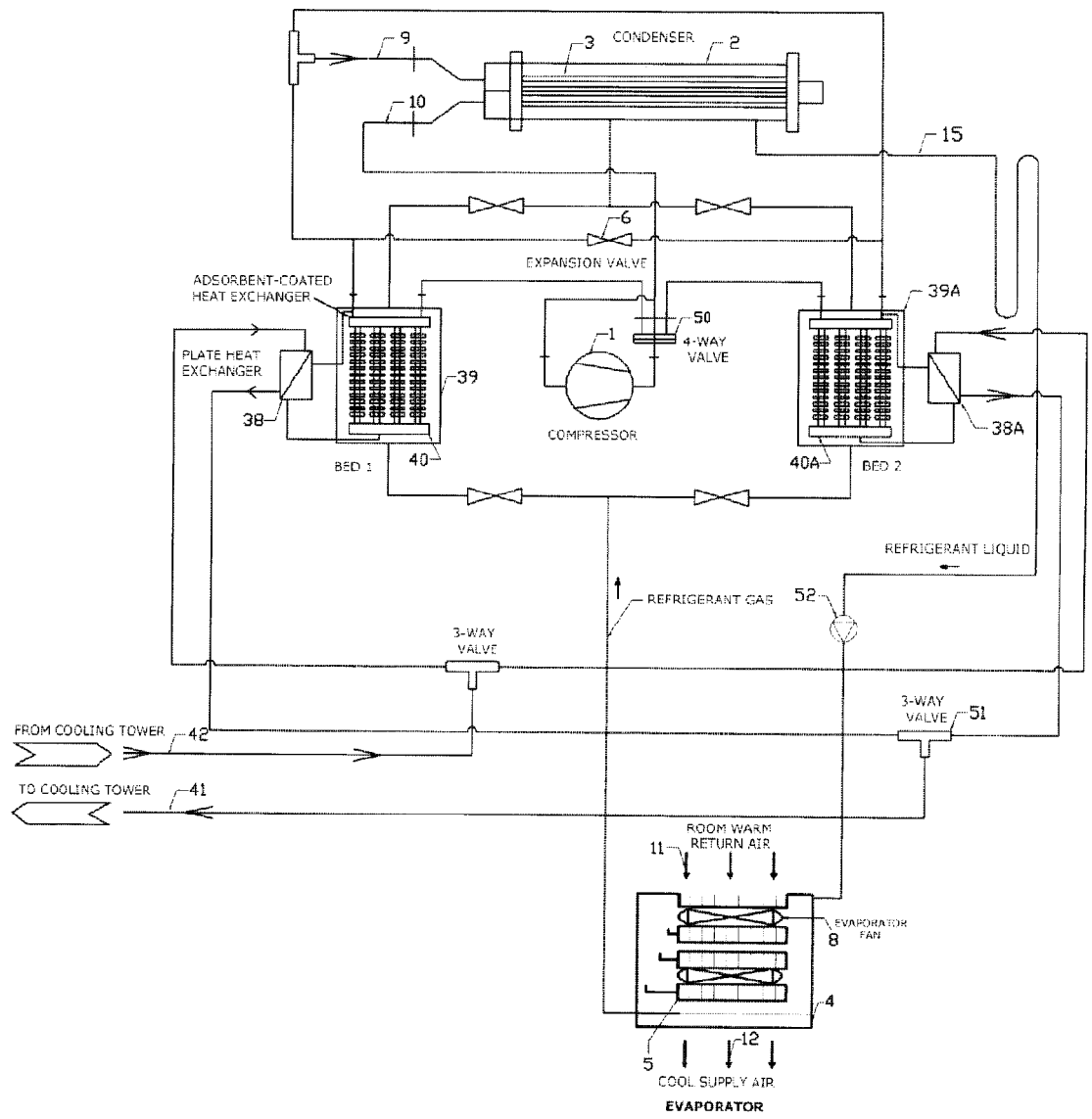

FIGURE 10a (iii)
ANOTHER TYPICAL HYBRID VAPOUR COMPRESSION UNIT/ADSORPTION COOLING UNIT
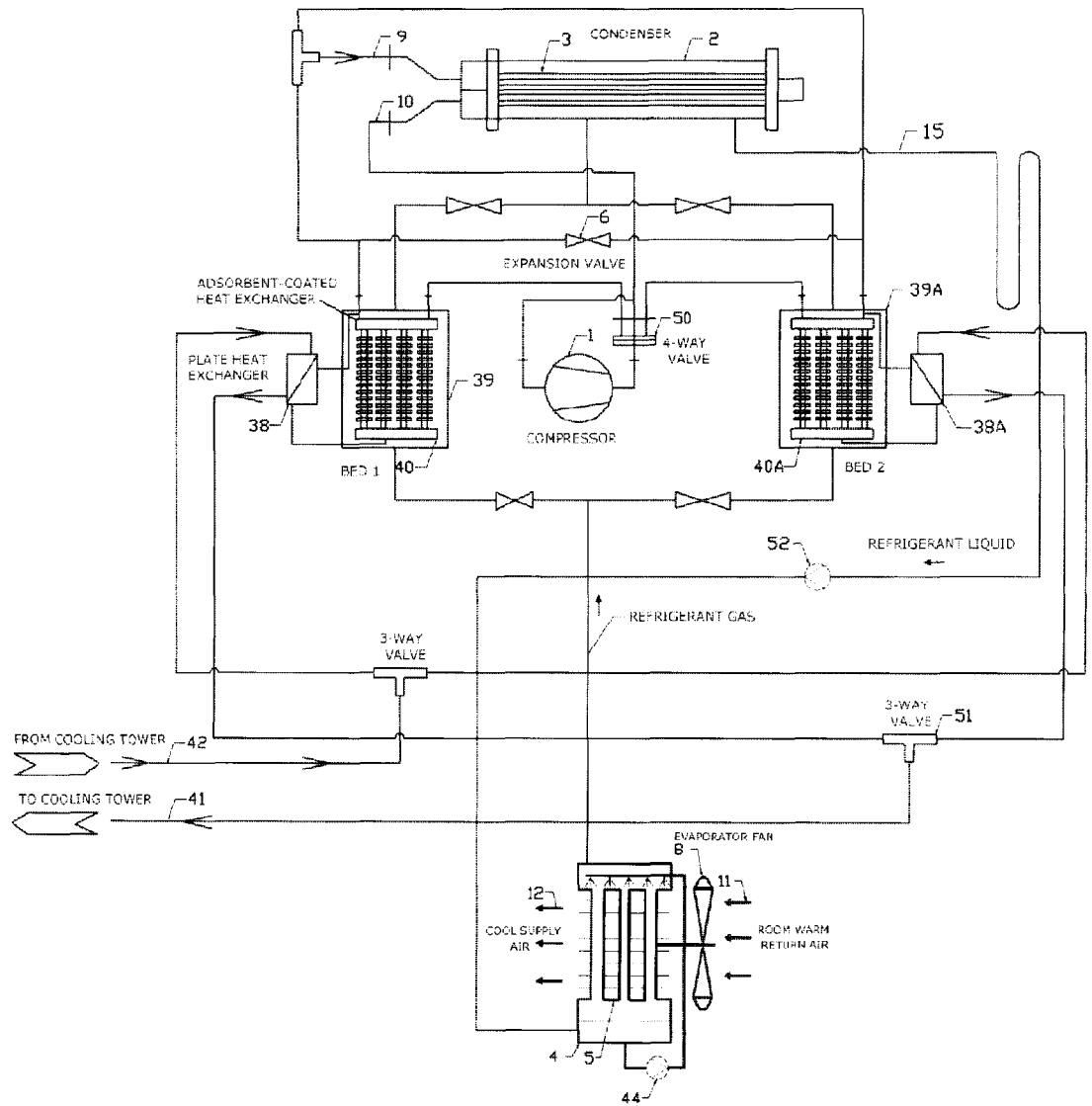

ANOTHER TYPICAL HYBRID VAPOUR COMPRESSION UNIT/ADSORPTION COOLING UNIT

TYPICAL HYBRID VAPOUR COMPRESSION UNIT/ABSORPTION COOLING UNIT

TYPICAL HYBRID VAPOUR COMPRESSION UNIT/ABSORPTION COOLING UNIT

FIGURE 11a (ii)
TYPICAL HYBRID VAPOUR COMPRESSION UNIT/ABSORPTION COOLING UNIT
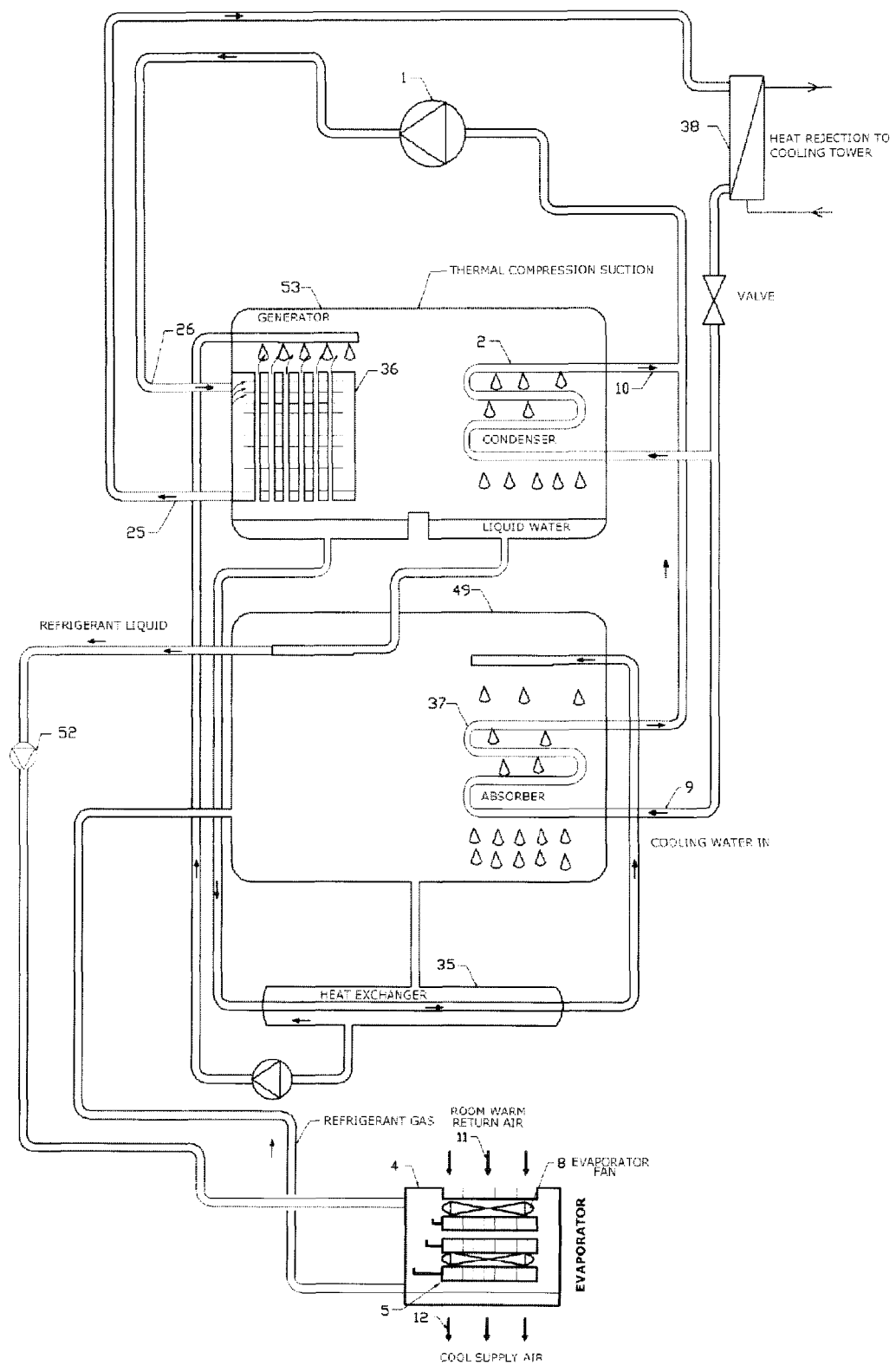

FIGURE 11a (iii)
TYPICAL HYBRID VAPOUR COMPRESSION UNIT/ABSORPTION COOLING UNIT
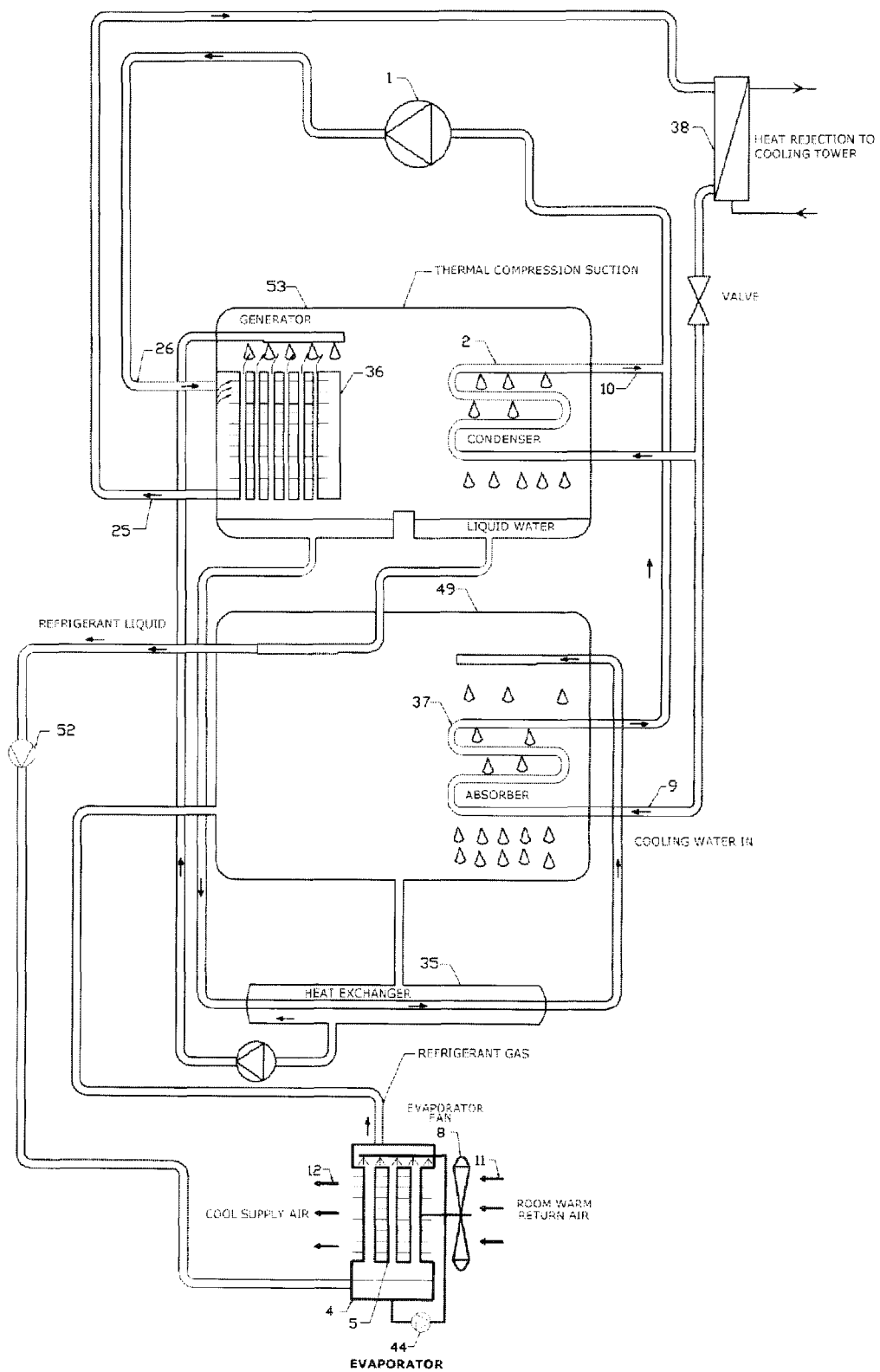

TYPICAL HYBRID VAPOUR COMPRESSION UNIT/ABSORPTION COOLING UNIT

SPLIT LEVEL SORPTION REFRIGERATION SYSTEM

This application is the U.S. national phase of International Application No. PCT/IN2016/000007 filed Jan. 6, 2016 which designated the U.S. and claims priority to IN Patent Application No. 68/DEL/2015 filed Jan. 8, 2015, the entire contents of each of which are hereby incorporated by reference.

The present invention relates to a novel split level sorption refrigeration system. In particular, the present invention provides a split level sorption based system as a novel method of using the traditional sorption based refrigeration unit. The present invention particularly provides a novel split level adsorption system. The present invention offers orientation free configuration with efficient cooling power delivery to the various cooling load locations which is achieved by splitting the evaporator of the adsorption chiller from the sorption beds and the condenser. The essential focus of the invention is on separating the functions of condensation and thermal compression from evaporation in the device, and in particular, in optimizing refrigerant flow in the device, to enable a more functionally friendly mode of operation. The invention also provides a method for split level sorption refrigeration as is described hereinafter.

BACKGROUND OF THE INVENTION

There is a call for rapid development of environmentally friendly technologies, because of environmental issues such as global warming, air and water pollution as well as primary energy consumption for heating and cooling. Among them, low temperature heat source driven or thermally powered adsorption systems are considered as one of the key technologies as these systems can recover and reuse low temperature waste heat sources typically below 100° C. [1-3], which otherwise will be purged to the ambient.

There is a recognized need to replace existing mechanically or electrically driven vapor compression based systems used for chilling or refrigeration purposes. Such systems typically use gases such as hydrofluorocarbons (HFCs). The $27^{th}$ Meeting of the Parties to the Montreal Protocol (MOP27) was held at UAE in 2015 and discussed about the regulations HFCs) under the Montreal Protocol. Accordingly, there is an urgent need to replace the use of such material in view of the deleterious effect they have on the environment. [1-3]

Mechanical refrigeration units are well known. These units work on a vapor compression refrigeration cycle wherein the condenser unit and an evaporator unit are connected to each other through an electric compressor and a refrigerant line. Such systems typically use synthetic refrigerants such as Freons, chlorofluorocarbons (CFCs) and hydrofluorocarbons (HFCs) as the working fluid. While vapor compression systems are efficient and compact, the substances being used as working fluid are increasingly being found responsible for a range of environmental problems including ozone layer depletion and global warming, and have also have been found to be carcinogenic.

The vapor compression system has essentially four main components: the electrically driven compressor, a condenser, and a throttling valve/expansion device, and an evaporator. In a unitary product these are all housed on/in a single frame/casing. In a split unit, there are two main sub sections into which the above referred unitary product is divided. One is referred to as the outdoor unit, or the condensing unit, which houses mainly the electric compressor and the condenser, and the other is referred to as the indoor unit, or the cooling unit. It is in this indoor or cooling unit that the evaporator section is housed along with a throttling device.

Vapor compression systems, whether used as a unitary model or as a split level model, essentially comprise a condenser unit to cool the working fluid down and to re-circulate it to an evaporator unit that is in direct contact with the atmosphere/space/fluid to be cooled. The evaporated working fluid, also referred to as the refrigerant, is returned back to the condenser unit through an electric compressor unit. The power consumption levels of such vapor compression based systems are also high leading to a high carbon footprint.

Over the last several decades, split units with a remote/indoor heating/cooling unit have become very popular, particularly up to 35 kW as a single split, and generally over 3 to 5 kW as multiple splits from a common outdoor condensing unit or outdoor VRFs referred to as variable refrigerant units.

Heat operated cooling systems are known in the art which use vapor absorption or vapor adsorption as the working principle. However, such systems are known only for unitary (non-split level) units where the condenser and the evaporator units necessarily have to be provided in the same housing in close proximity to each other. While these systems overcome some of the disadvantages of synthetic refrigerant based systems, they suffer from the disadvantage that they are useful/economical mainly for larger capacity (>30 RT capacity) systems. The adsorption or absorption refrigeration cycle utilized in such systems comprises replacement of the electric compressor of the mechanical refrigeration cycle with an absorber or adsorber based heat exchanger. The absorber or adsorbers are referred to as thermal compressors, as akin to the electric compressor, and if taken together with condenser section, the two would be akin to the condensing unit of the conventional vapor compression unit or system. While adsorption based cooling technology was developed a few decades ago, both, the prohibitive cost and difficulty of making units in small capacities/sizes have not made this technology very viable. In the recent 5 to 10 years, two things have happened that are note-worthy. For one, there has been a strong push to develop green technologies. Government support across the globe, new regulations, and fiscal incentives have made this possible, particularly in the background of urgent need for $CO_2$ reduction based on enhanced usage of renewal energy options, waste heat etc. and less reliance on synthetics refrigerants that are used extensively in current electric vapor compression cooling machines.

Recent technological advancements have made it possible to reduce cost and size of unitary adsorption units, and hence increase usage, particularly in the range of <20 kW. In the last 5 to 10 years, increasing commercial viability of smaller capacity adsorption cooling units has led to a need in the art to go a step further and develop a split type adsorption cooling unit comprising essentially of two parts, namely the condensing unit, comprising the thermal compressor and condenser, and the indoor/remote evaporator section/unit comprising the evaporator heat exchanger as well as the means to throttle the liquid refrigerant.

However, despite the recent advent of commercially available adsorption units, particularly under 20 kW, mainly in the last 4 to 6 years, there has been no apparent attempt made to develop any split type adsorption units, where the evaporator section is remote from the remaining components of the adsorption unit.

The unitary design of the adsorption or absorption systems imposes significant losses arisen from heat transfer from the additional air handling unit which conveys the cooling load from different sources to the evaporator of the adsorption chiller using the chilled water circuit. The present invention improves the efficiency and reduces the capital cost of the adsorption chiller by introducing split type adsorption system that eliminates the chilled water circuit as well as orientation free cooling system.

PRIOR ART

Several different split type units have been postulated in the art related to conventional vapor compression systems. US Patent Publication 2015/0192309 discloses a split air conditioner having an indoor unit, an outdoor unit. The indoor unit is connected to the outdoor unit by a horizontal bar thereby allowing the use of the windowsill as a support to the split air conditioner. There is no reference to guidance towards use of an adsorption based thermal compression method in this disclosure. On the contrary it focuses on improving the mobility and flexibility in use of regular prior art room type split air conditioners. EP 0789201 discloses a split type air conditioner with an indoor unit and an outdoor unit. This disclosure focuses on the control through a mechanical temperature device detector provided in the outdoor unit to detect the frosted condition of the outdoor heat exchanger, and activate the current transformer in the indoor drive circuit of the outdoor fan motor. Again there is no disclosure or guidance towards the use splitting of the evaporator component as well as towards use of thermal compression. US Patent publication 2006/0042290 discloses a split type room air conditioner. The focus in this disclosure is on ensuring access of split type room air conditioning to apartment buildings and condominiums. However, not only is there no disclosure as to how this purported objective is achieved, there is no disclosure at all of any specific compression means or to splitting the evaporator section.

The above representative disclosures show that while research is on in the area of split type air conditioners, attention has not been paid to ensuring separation of evaporator component and use of thermal compression means.

Similarly, several different adsorbent based cooling systems have been postulated in the art for the adsorption type heating/cooling units. U.S. Pat. No. 8,590,153 discloses an adsorption heat exchanger where an adhesive layer is formed on the heat exchanger structure and the exchanger is then dipped into sorbent material to ensure adhesion thereof. US Patent Publication 2012/0216563 discloses a heat exchanger wherein a porous material is provided in contact with the tubular portion of the exchanger in order to allow vapor to pass through. The material is a fibrous material. US Patent Publication 2013/0014538 discloses a sub-assembly for an adsorption chiller, comprising an adsorption component including a multiplicity of plates which are arranged in a stack. The refrigerant sides of adjacent pairs of the plates in the stack define refrigerant passages and an adsorbent material is provided within these passages. JP Patent Publication No. 2005-291528 discloses a heat exchanger with enhanced adsorber capacity. The heat exchanger comprises a plate fin tube type heat exchanger with a specific fin pitch, fin length and fin height. Activated charcoal is used as a filler adsorbent wherein the charcoal has specific steam adsorbing capacity. The bed so formed is covered by a net like material to prevent leakage of adsorbent material.

None of the above disclosures provide any information or guidance towards a split adsorption refrigeration unit wherein the evaporator component is kept remote from the condenser and compressor units and wherein at least one compressor unit is a thermal compression unit. To the best knowledge of the applicants herein, no apparent attempt has been made to invent the split type adsorption unit with a remote cooling section nor have the technical challenges been addressed to overcome the same.

SUMMARY OF THE INVENTION

The present invention provides a split level air conditioning system which utilizes a two- or multiple-bed, single or multi-stage adsorption cycle or a single or multi stage absorption cycle as its working norm. In the present invention, the evaporator serves as both the air handling unit and the evaporation unit of the adsorption/absorption chiller hence effectively eliminating the chilled water circuit.

In one embodiment, the entire evaporator section, also referred to as the indoor unit/section, is decoupled from the main unit, leaving the outdoor unit, also referred to as the condensing unit, which comprises the thermal compressor and the condenser.

In this embodiment, the evaporator tubes may be placed horizontally or vertically with airflow, or the fluid to be cooled, on the external surface of the tubes, with or without extended fins or enhanced surface, with refrigerant passing through and evaporating in the tubes. In this embodiment, the evaporator and the adsorber beds or the absorber are connected via single or multiple vapor ducts with the liquid condensate returning from the condenser to the evaporator. A small liquid pump may be required require on the condensate line to make orientation free especially where the evaporator unit is located higher than the pressure difference between the evaporator and the condenser. This split type evaporation is also applicable to different adsorbent/absorbent cum refrigerant pairs in combination with various throttling/expansion devices and substitutes thereof, like throttling valves, orifices, capillaries, metering devices, and the like.

This type of split evaporator, in this embodiment, is also applicable to mobile transport units using adsorption or hybrid vapor compression/adsorption units.

In another embodiment, the heat exchanger tubes, normally copper or metal, typically provided in the evaporator section, are taken out and housed in a remote/indoor unit. Here, the evaporator and adsorber/absorber beds are connected only by liquid refrigerant lines. A liquid refrigerant pump is used to convey refrigerant between the evaporator and the pseudo evaporator or the spray chamber. This results in the evaporator section becoming a cooling section or pseudo-evaporator section. The term 'pseudo-evaporation' hereinafter refers to the specific embodiment where the evaporation means is separated from the cooling section and the evaporation means is housed, either with the condenser section or independently. This type of split evaporator, is also applicable to different adsorbent/absorbent cum refrigerant pairs in combination with various throttling/expansion devices and substitutes thereof, like throttling valves, orifices, capillaries, metering devices, and the like.

This type of split evaporator, in this embodiment is also applicable to mobile transport units using adsorption or hybrid vapor compression/adsorption units.

Therefore, the invention provides a split type air conditioning unit comprising:
- a first component containing one or more compression means wherein at least one compression means is a thermal compression means, and a condensation means; and
- one or more second component(s) separate from the first component each provided in a dedicated housing and comprising an evaporation means;
- each evaporation means being connected to the condensation means through one or more refrigerant inlet line(s) and one or more refrigerant outlet line(s);
- the one or more of said refrigerant outlet line(s) providing used refrigerant fluid from each evaporation means through the one or more compression means to the condensation means;
- the one or more refrigerant inlet line(s) conveying condensed refrigerant fluid to each evaporation means from the condensation means.

In one embodiment of this invention, the compression means is selected from the group consisting of an adsorption unit, an absorption unit, a hybrid vapor compression/adsorption unit, and a hybrid vapor compression/absorption unit.

In another embodiment of this invention the compression means is an adsorption unit or a hybrid vapor compression/adsorption unit.

In yet another embodiment of this invention the adsorbent used in case of an adsorption unit or hybrid vapor compression/adsorption unit is selected from the group consisting of zeolites, mesoporous silicates, insoluble metal silicates, silica gel type A, silica gel type RD, silica gel type S2, activated carbon fiber, granular activated carbon, activated alumina, highly porous activated carbon, $Zr_6O_4(OH)_4$ bonded with linkers, MIL-101Cr, metal-organic frameworks (MOFs), covalent organic frameworks (COFs), functional adsorbent materials, and the like, alone or in any combination thereof.

In yet another embodiment of this invention, the compression means is an absorption unit or a hybrid vapor compression/absorption unit.

In another embodiment of this invention, the absorption unit or the hybrid vapor compression/absorption unit is provided with a refrigerant-absorbent mixture selected from the group consisting of water-lithium bromide, ammonia-water, and the like.

In another embodiment of this invention the refrigerant is selected from the group consisting of water, methane, methanol, ethanol, ammonia, propane, CFCs, 134A, and the like.

In another embodiment of the invention, each refrigerant inlet line(s) is provided with one or more refrigerant flow control means selected from different types of throttling/expansion devices, such as expansion valves, capillaries, P-traps, and metering devices.

In another embodiment of this invention, the evaporator(s) are selected from the group consisting of falling film tubular (horizontal/vertical), rising/falling film tubular, forced circulation (tubular/plate), plate-type, falling film plate, and forced circulation, and any combination thereof, all with or without enhanced surface treatment for aiding surface evaporation.

In another embodiment of this invention, the split unit when containing an adsorption unit or hybrid vapor compression/adsorption unit, is mountable on any vehicular device.

In another embodiment of this invention, the heat exchange tubes from the evaporator are taken out and located in a separate split indoor/remote/cooling unit, and a pseudo evaporation means is employed in the outdoor unit to cool the refrigerant to supply to the split indoor/remote/cooling unit.

This invention also provides a split type air conditioning unit comprising:
- a first component containing one or more compression means wherein at least one compression means is a thermal compression means, and a condensation means, and a pseudo-evaporation means; and
- one or more second component(s) separate from the first component each provided in a dedicated housing and comprising a cooling means;
- each cooling means being connected to the pseudo evaporator means through one or more liquid refrigerant supply and return line(s);
- the one or more of said liquid refrigerant return line(s) providing discharged liquid refrigerant from each cooling means to the pseudo evaporator means, wherein the liquid portion of discharged refrigerant is returned to the pseudo evaporator means, and vaporized refrigerant from the pseudo evaporator is directed to the condenser through the compression means for condensation and recirculation.

In one embodiment of this invention, the compression means is selected from the group consisting of an adsorption unit, an absorption unit, a hybrid vapor compression/adsorption unit, and a hybrid vapor compression/absorption unit.

In another embodiment of this invention the compression means is an adsorption unit or a hybrid vapor compression/adsorption unit.

In yet another embodiment of this invention the adsorbent used in case of an adsorption unit or hybrid vapor compression/adsorption unit is selected from the group consisting of zeolites, mesoporous silicates, insoluble metal silicates, silica gel type A, silica gel type RD, silica gel type S2, activated carbon fiber, granular activated carbon, activated alumina, highly porous activated carbon, $Zr_6O_4(OH)_4$ bonded with linkers, MIL-101Cr, metal-organic frameworks (MOFs), covalent organic frameworks (COFs), functional adsorbent materials, and the like, alone or in any combination thereof.

In yet another embodiment of this invention, the compression means is an absorption unit or a hybrid vapor compression/absorption unit.

In another embodiment of this invention, the absorption unit or the hybrid vapor compression/absorption unit is provided with a refrigerant-absorbent mixture selected from the group consisting of water-lithium bromide, ammonia-water, and the like.

In another embodiment of this invention the refrigerant is selected from the group consisting of water, methane, methanol, ethanol, ammonia, propane, CFCs, 134A, and the like.

In another embodiment of this invention, the pseudo evaporator unit has an evaporation means selected from the group consisting of falling/sprayed film over a component with considerably expanded surface area of the type cooling tower fill, wire mesh wool, metal or inorganic fiber foam, and the like.

In another embodiment of the invention, the cooling unit has a heat exchanger selected from a traditional tube fin heat exchanger and enhanced tube heat exchanger.

In another embodiment of this invention, the split unit when containing an adsorption unit or hybrid vapor compression/adsorption unit, is mountable on any vehicular device.

BRIEF DESCRIPTION OF ACCOMPANYING DRAWINGS

The invention will be described in greater detail below inter alia, with reference to the accompanying drawings, where:

FIG. 6 is a block diagram of the broad embodiment of the invention depicting the isolation/remoteness of the cooling/indoor/remote unit from the remaining components of the device while retaining functional connectivity.

Figure 7A:
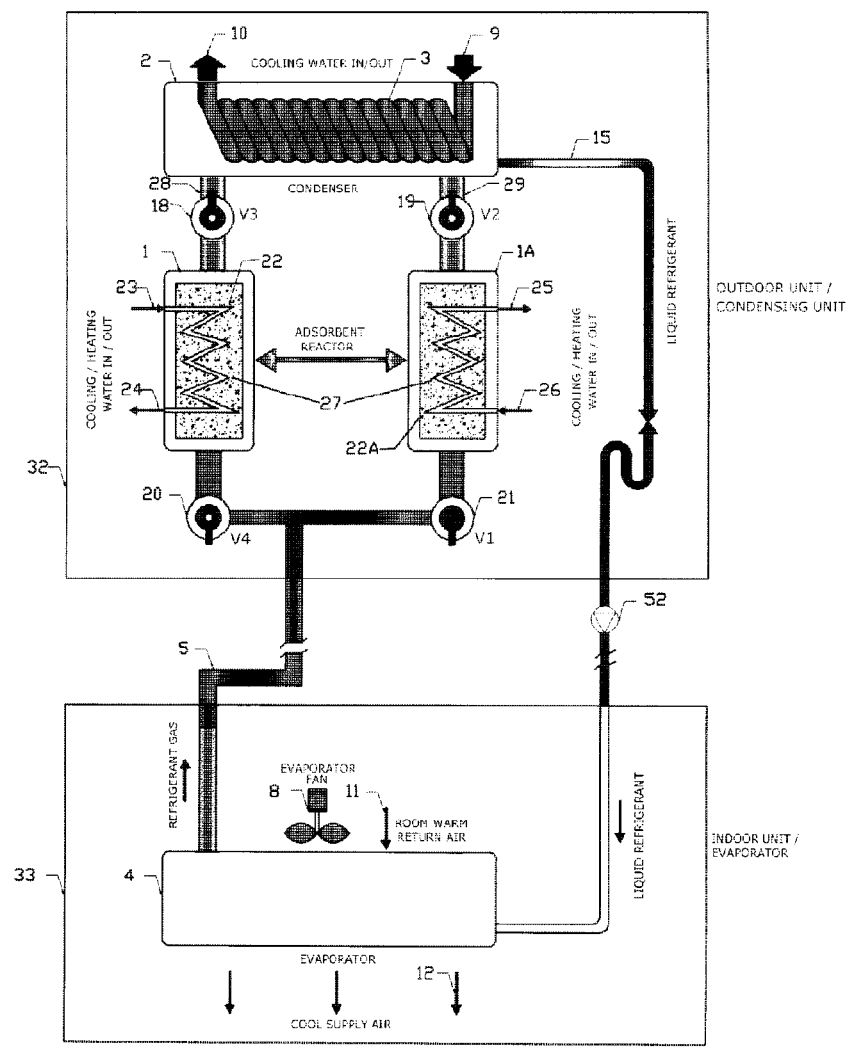
FIG. 7a is a schematic depiction of the split technology of the invention when applied to an adsorption cooling/air conditioning unit with the evaporator and evaporator tubes housed in a remote/indoor/cooling unit.
Figure 7A:
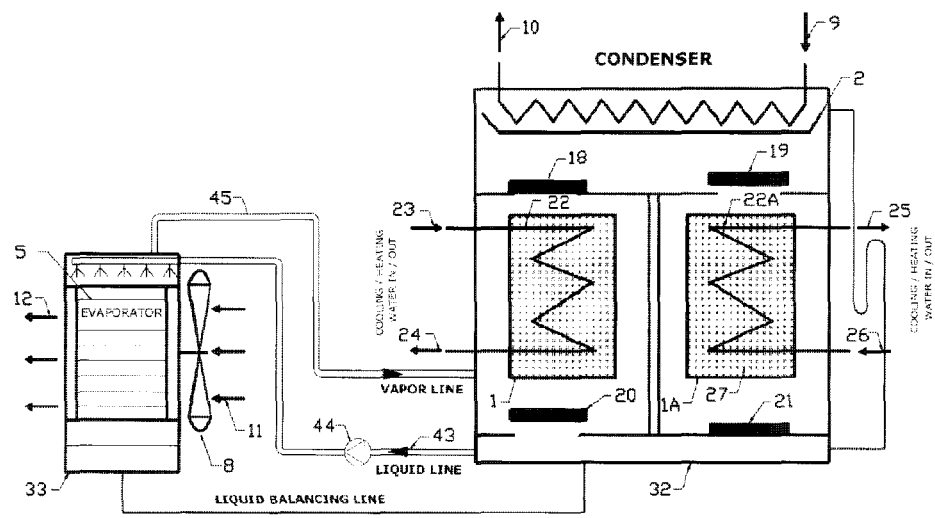

FIGS. 7a(i), 7a(ii) and 7a(iii) are schematic depictions in detail of the split technology of the invention when applied to an adsorption cooling/air conditioning unit.

Figure 7B:
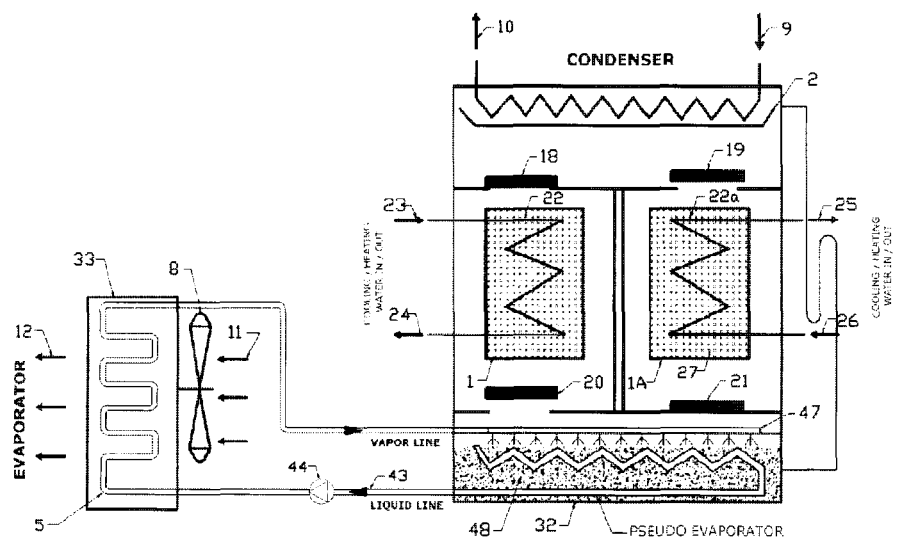

FIG. 7b is a schematic depiction of the split technology of the invention when applied to an adsorption cooling/air conditioning unit, wherein the cooling section is provided remote from the evaporation means.

Figure 8A:
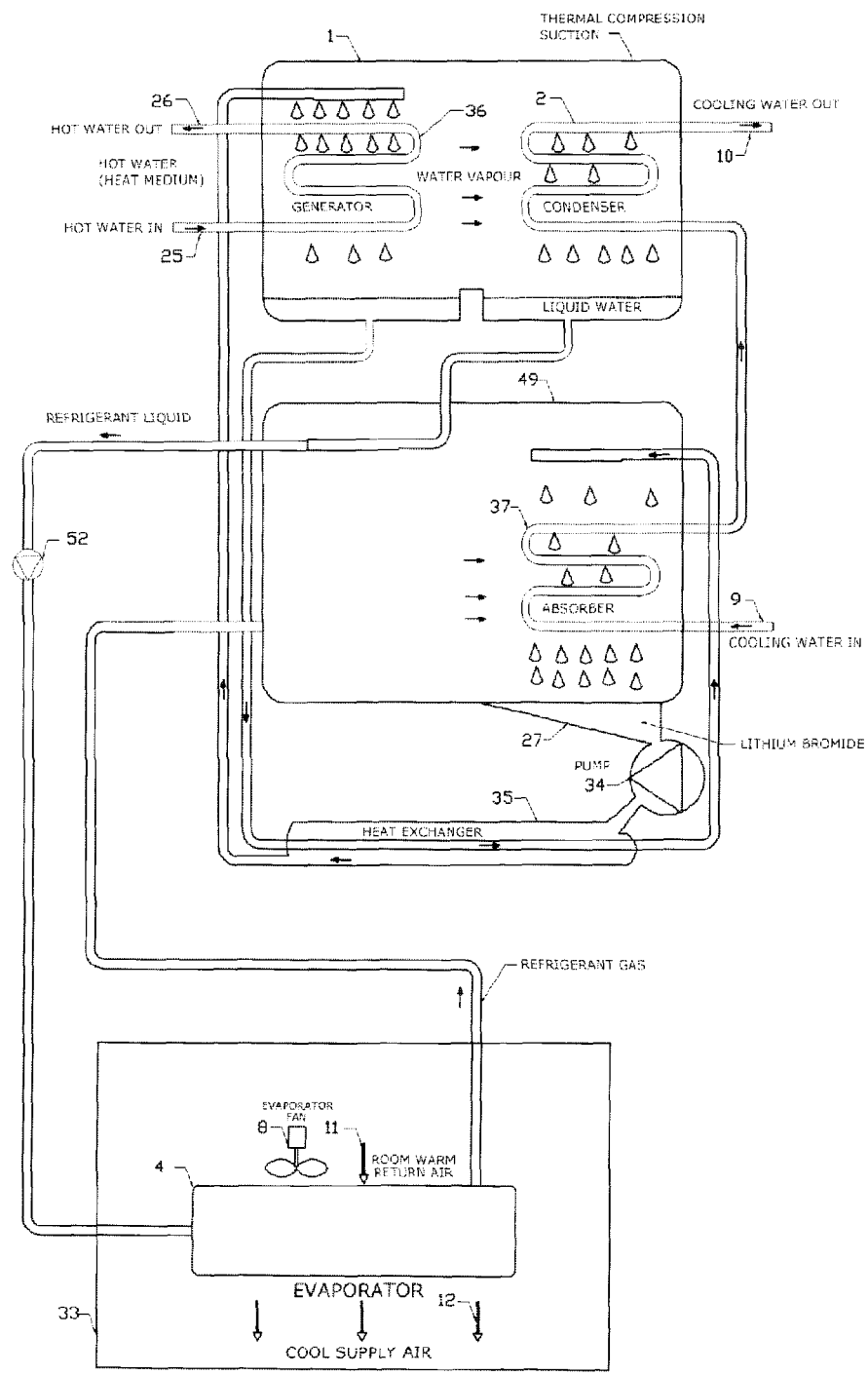
Figure 8A:
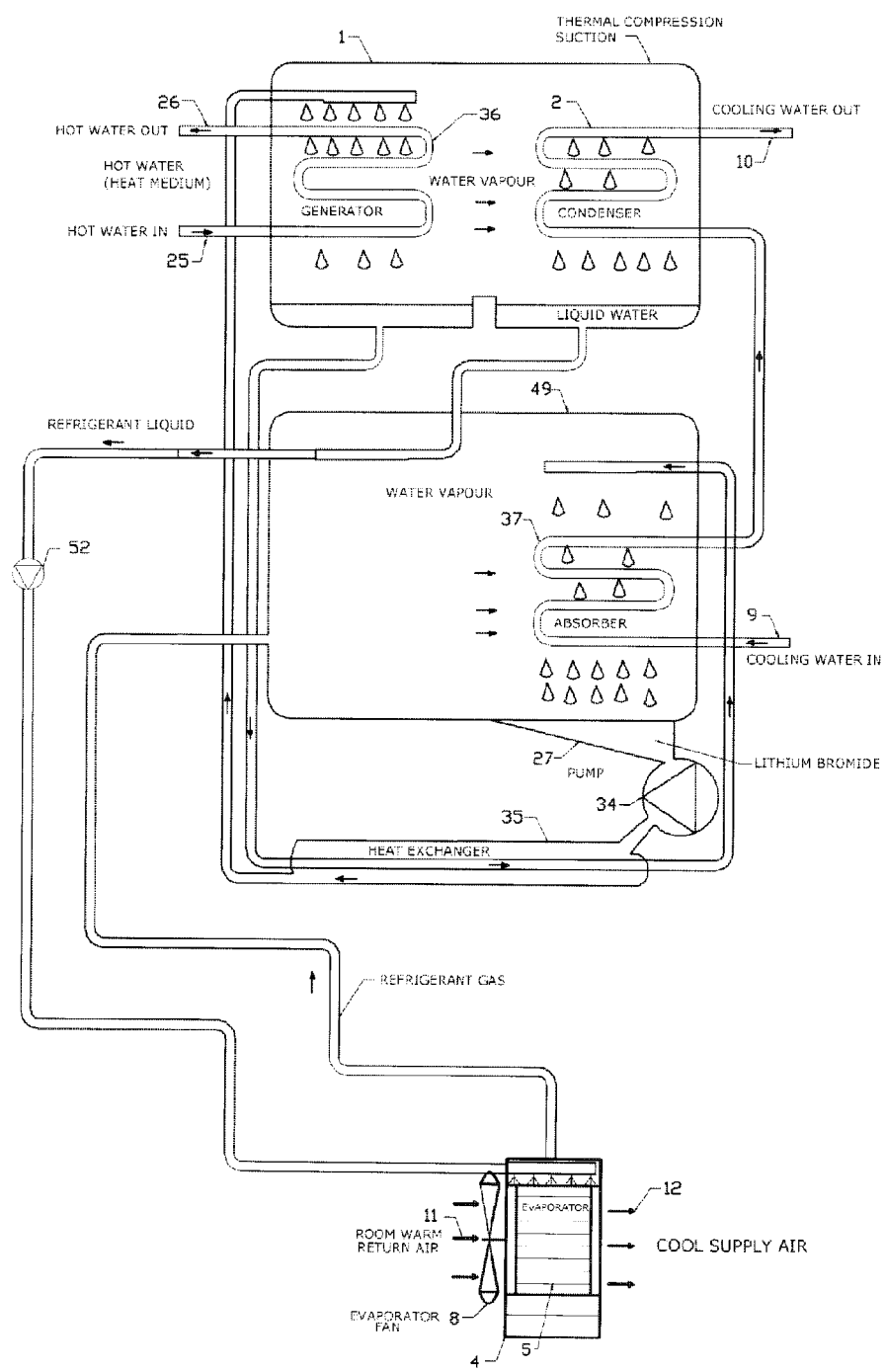

FIG. 8a is a schematic depiction of the split technology of the invention when applied to an absorption cooling/air conditioning unit with the evaporator and evaporator tubes housed in a remote/indoor/cooling unit.

FIGS. 8a(i), 8a(ii) and 8a(iii) are schematic depictions in detail of the split technology of the invention when applied to an absorption cooling/air conditioning unit.

Figure 8B:
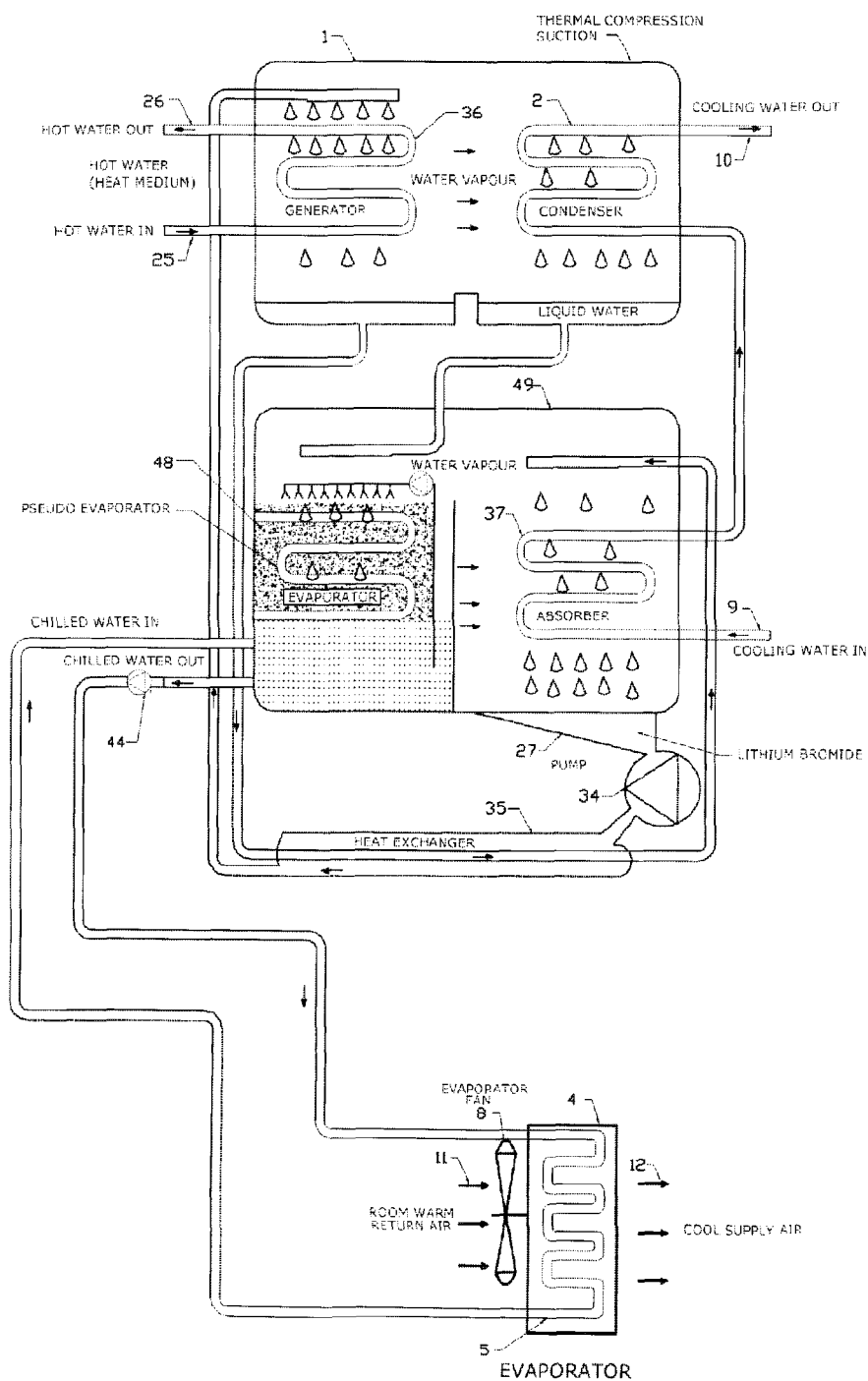

FIG. 8b is a schematic depiction of the split technology of the invention when applied to an absorption cooling/air conditioning unit, wherein the cooling section is provided remote from the evaporation means.

Figure 9A:
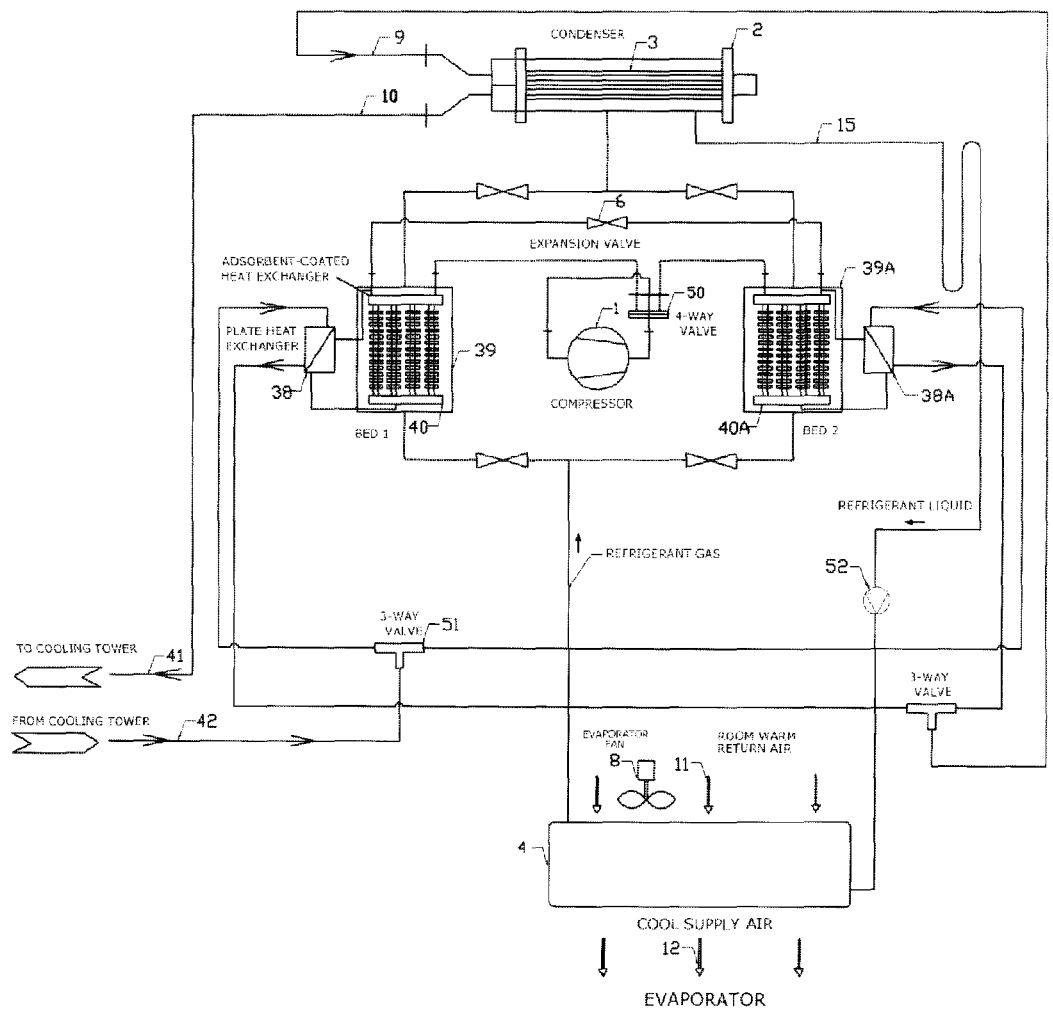
Figure 9A:
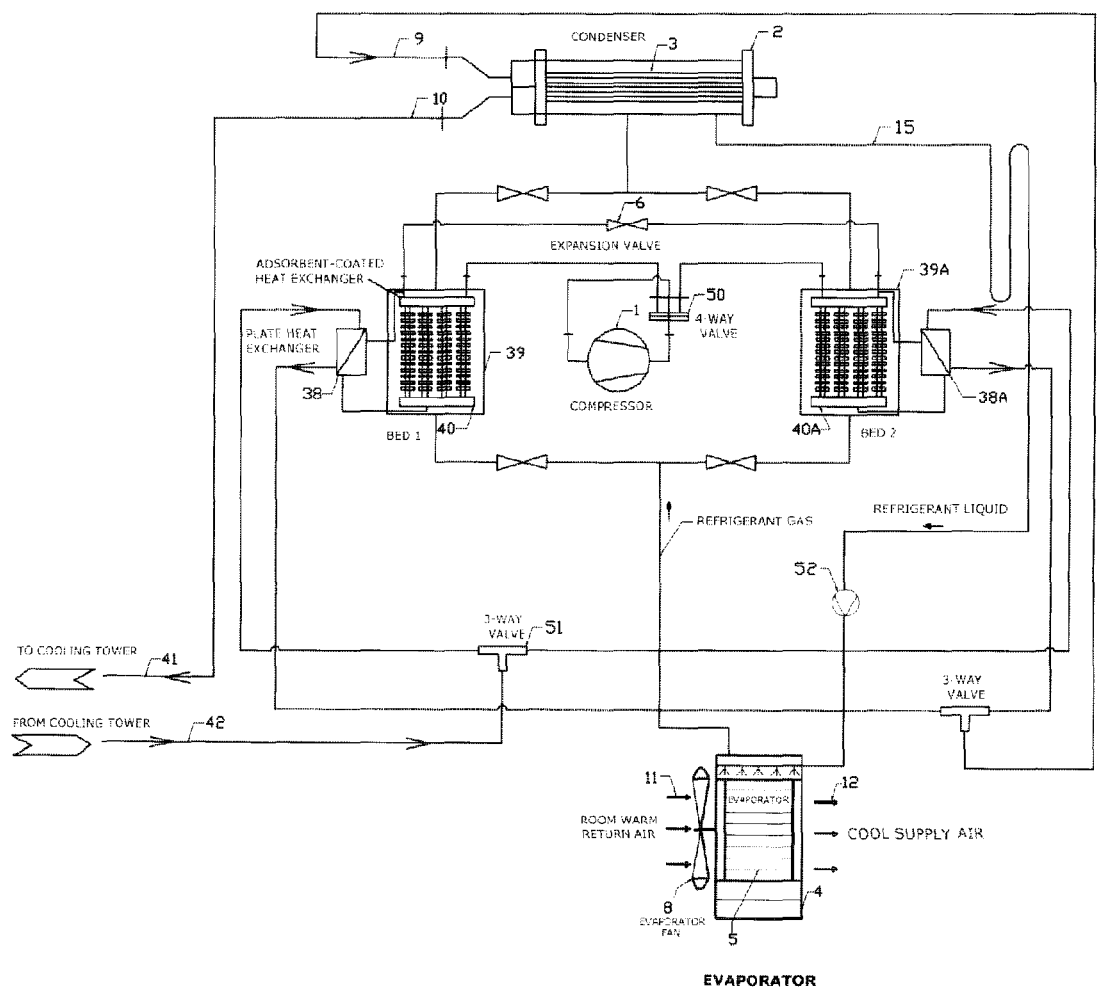

FIG. 9a is a schematic depiction of the split technology of the invention when applied to a hybrid vapor compression/adsorption cooling/air conditioning unit with the evaporator and evaporator tubes housed in a remote/indoor/cooling unit.

FIGS. 9a(i), 9a(ii) and 9a(iii) are schematic depictions of split technology of the invention when applied to hybrid vapor compression/adsorption cooling/air conditioning unit.

Figure 9B:
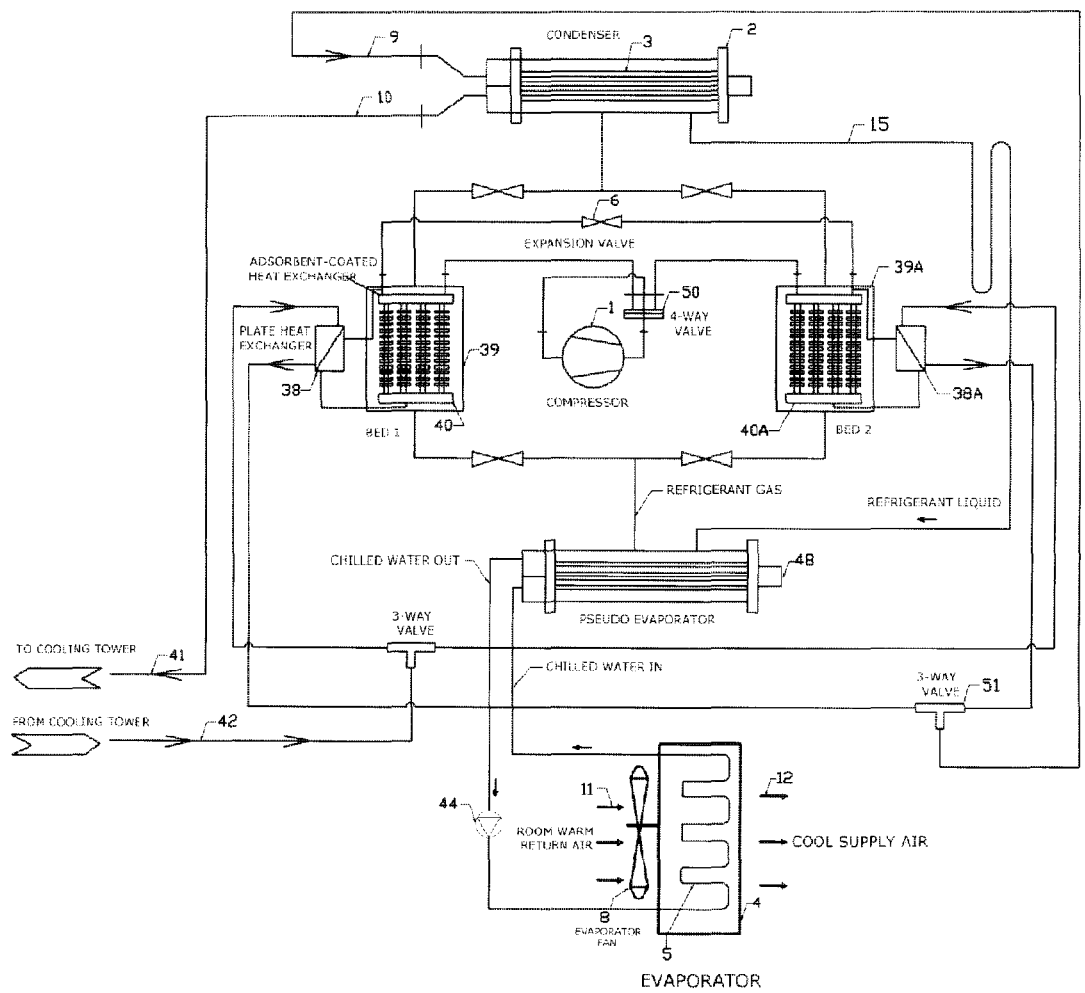

FIG. 9b is a schematic depiction of the split technology of the invention when applied to a hybrid vapor compression/adsorption cooling/air conditioning unit, wherein the cooling section is provided remote from the evaporation means.

Figure 10A:
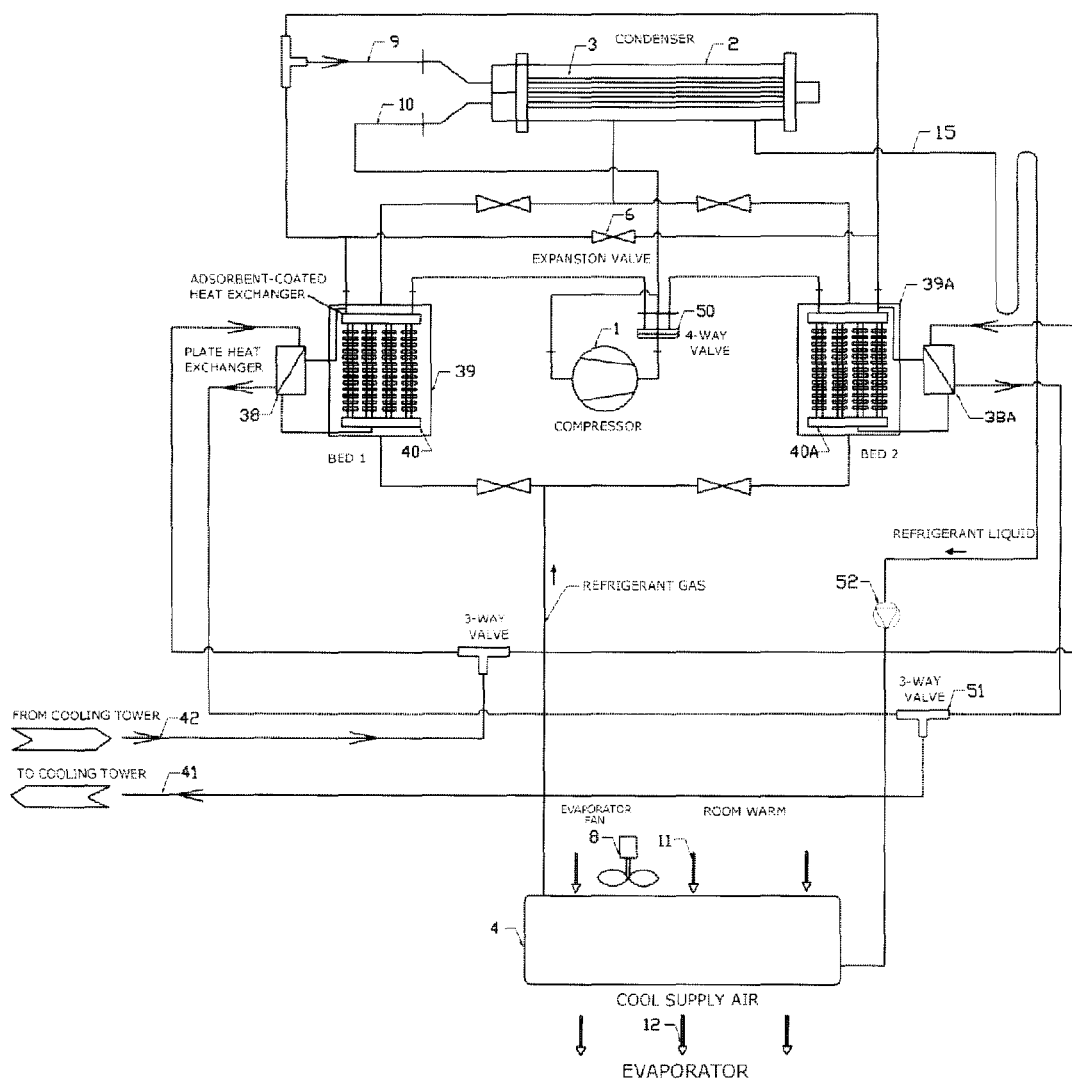
Figure 10A:
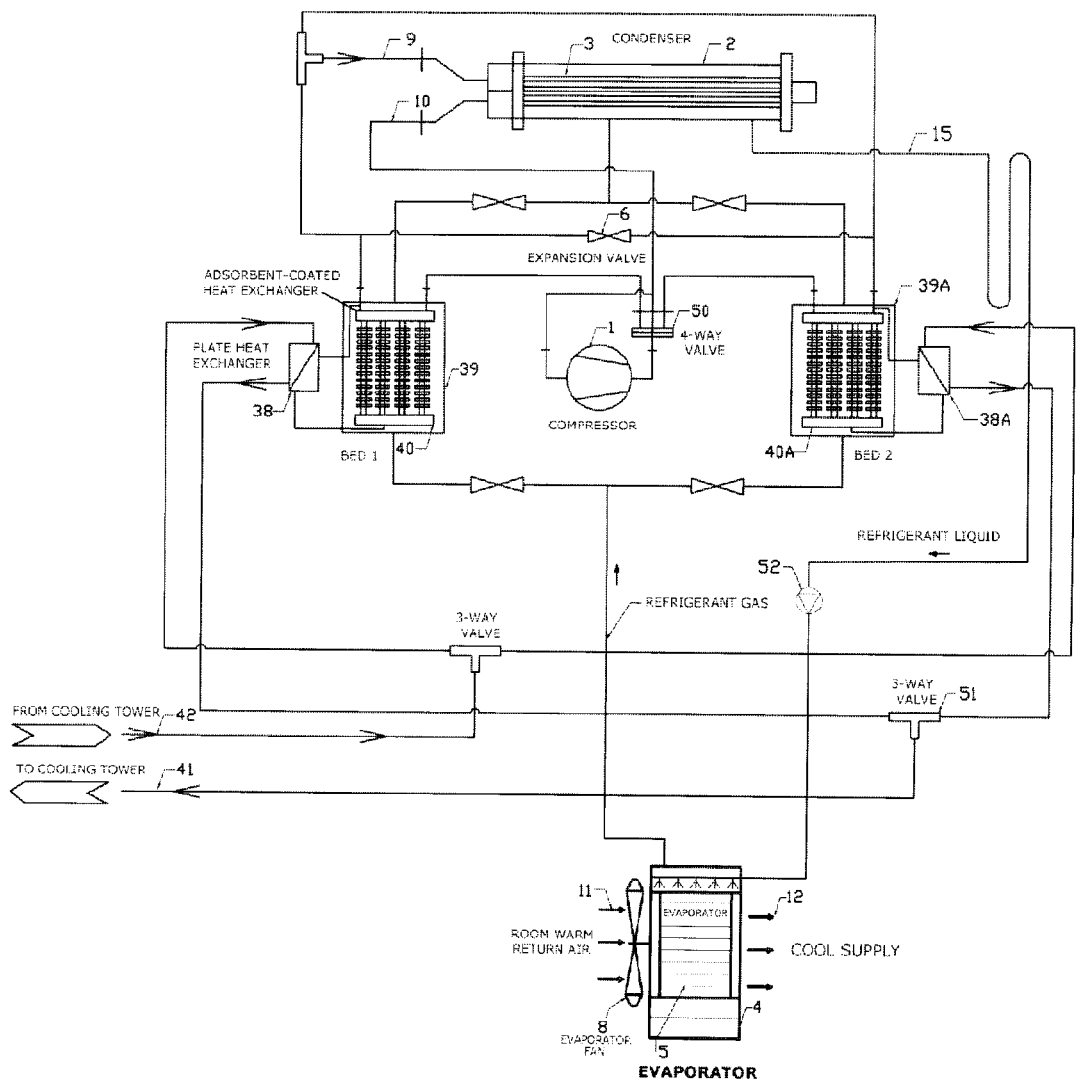

FIG. 10a is a schematic depiction of the split technology of the invention applied to another embodiment of hybrid vapor compression/adsorption cooling/air conditioning unit with evaporator and evaporator tubes housed in a remote/indoor/cooling unit.

FIGS. 10a(i), 10aii) and 10a(iii) are schematic depictions in detail of the split technology of the invention when applied to another embodiment of a hybrid vapor compression/adsorption cooling/air conditioning unit.

Figure 10B:
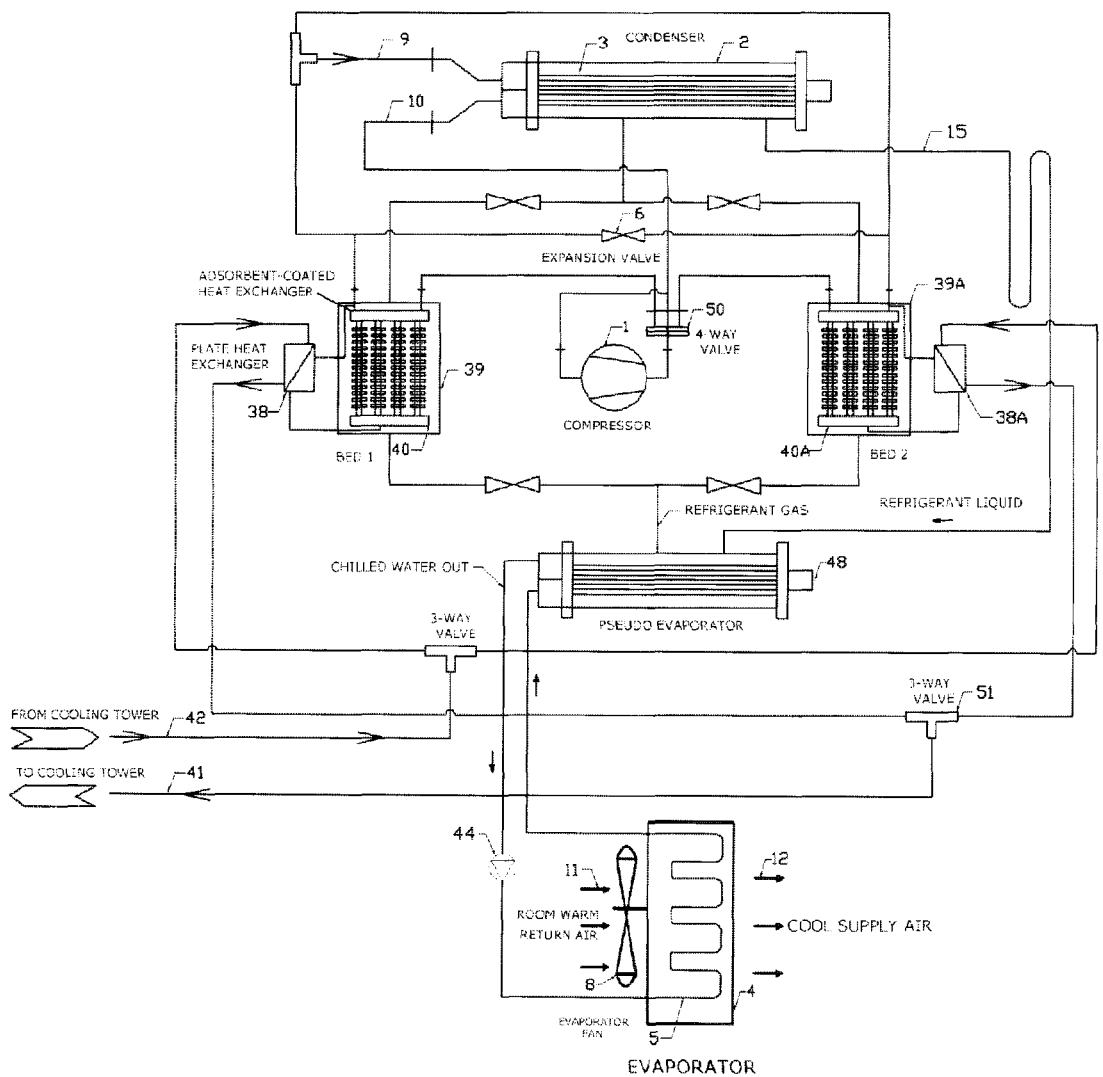

FIG. 10b is a schematic depiction of the split technology of the invention when applied to another embodiment of a hybrid vapor compression/adsorption cooling/air conditioning unit, wherein the cooling section is provided remote from evaporation means.

Figure 11A:
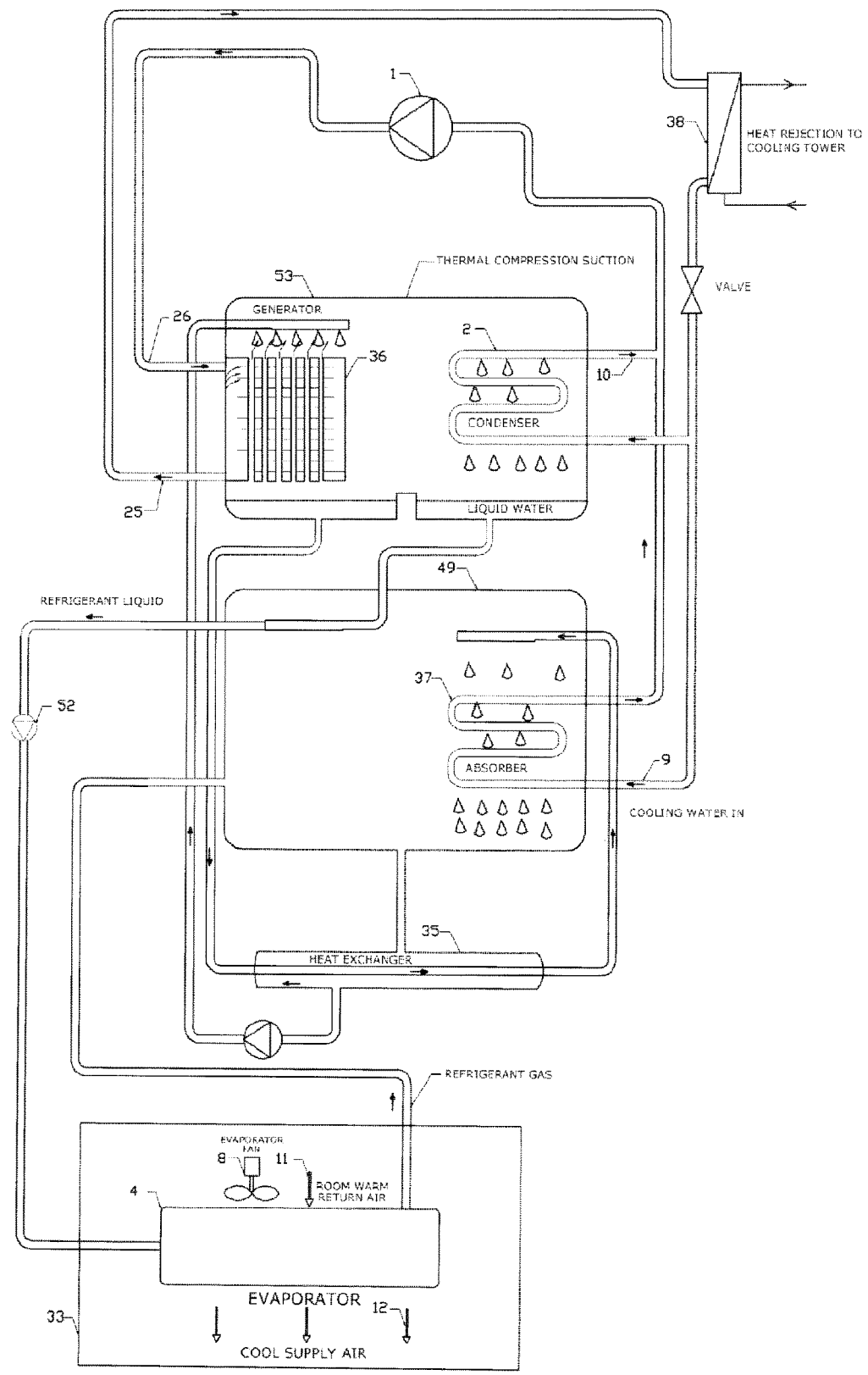
Figure 11A:
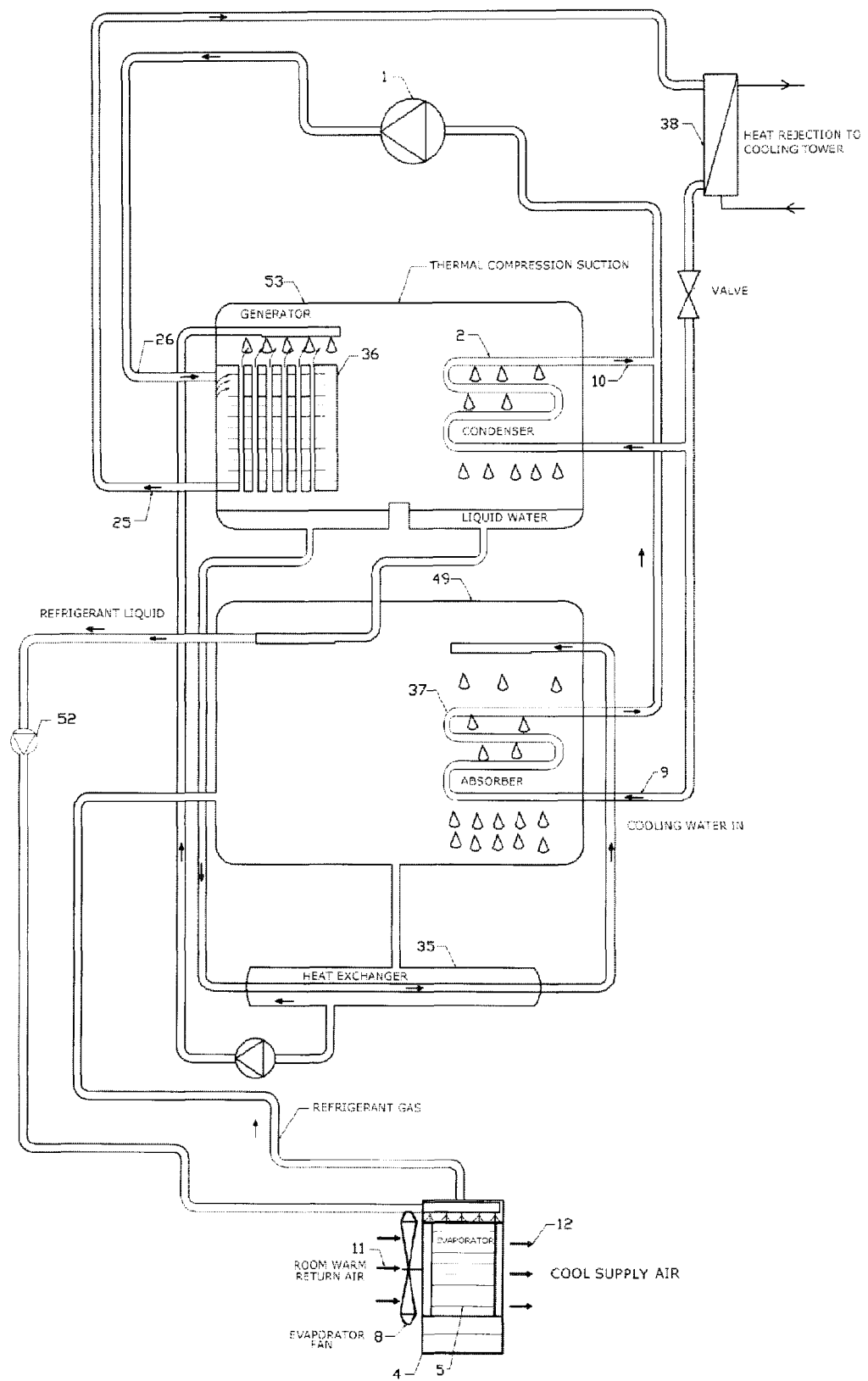

FIG. 11a is a schematic depiction of the split technology of the invention when applied to a hybrid vapor compression/absorption cooling/air conditioning unit with the evaporator and evaporator tubes housed in a remote/indoor/cooling unit.

FIGS. 11a(i), 11a(ii) and 11a(iii) are schematic depictions in detail of the split technology of the invention when applied to a hybrid vapor compression/absorption cooling/air conditioning unit.

Figure 11B:
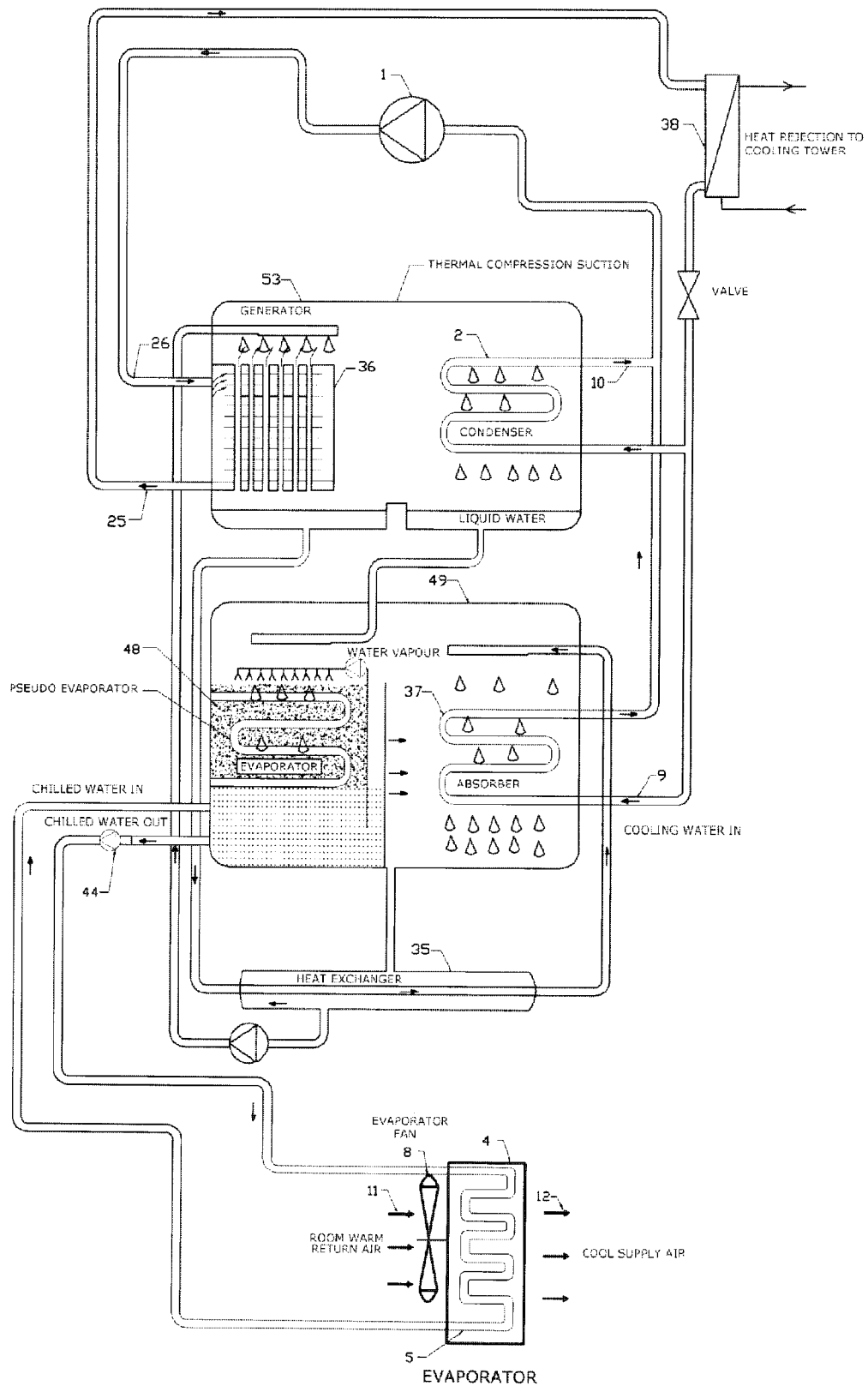

FIG. 11b is a schematic depiction of the split technology of the invention when applied to a hybrid vapor compression/absorption cooling/air conditioning unit, wherein the cooling section is provided remote from the evaporation means.

DETAILED DESCRIPTION OF THE INVENTION

The present invention will now be described with reference to the accompanying drawings.

In the present application, the term 'indoor unit' and cooling unit' when used with reference to the present invention, are used interchangeably. Specifically, the term 'pseudo-evaporation' refers to the various embodiments wherein the indoor/cooling unit is provided remote from the evaporation means, which can be combined with either with the condenser+compressor section or provided separately.

The invention essentially resides in 'splitting' or separating the indoor/cooling section/unit from the condensing unit, wherein at least one of the compression means used is a thermal compression means.

If desired, the indoor/cooling section can be further 'split' such that the cooling section is provided remote from the evaporator means. This specific embodiment is termed the 'pseudo-evaporator' or 'pseudo-evaporation' means/mechanism in this document.

Figure 1:
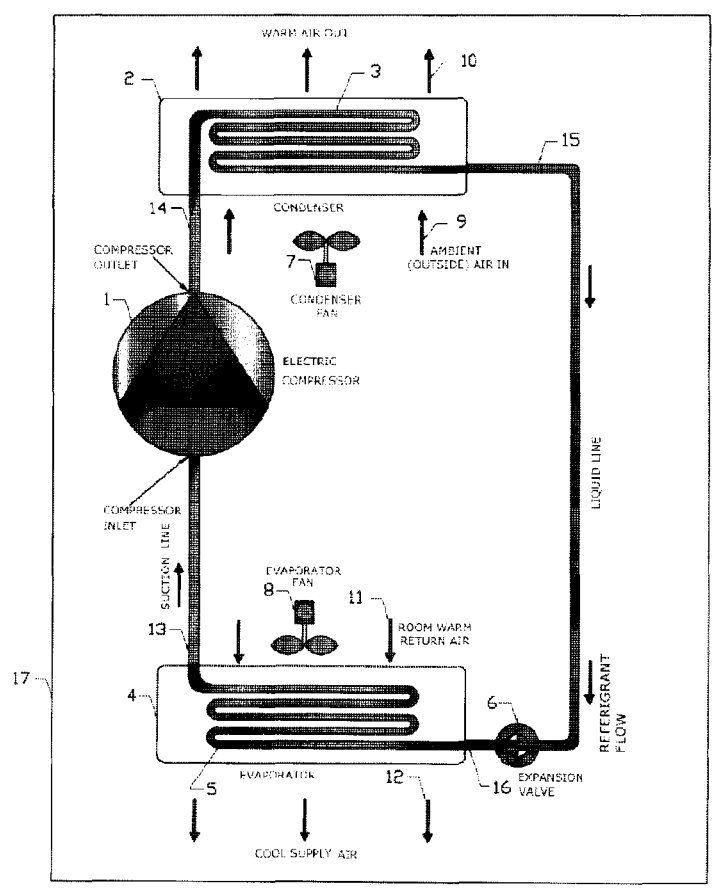
FIG. 1 is a depiction of prior art typical vapor compression unit or air conditioning unit.

FIG. 1, as stated above is a depiction of a prior art typical/traditional vapor compression unit of an air conditioning unit which uses a typical vapor compression refrigeration cycle. In this, several types of refrigerants can be used, most being CFCs or synthetics refrigerants, all having a direct impact on $CO_2$ production as well as contributing to global warming. Also these use electrical energy directly, which also is the focus for consumption reduction as the majority of electrical production is based in fossil fuels heavily contributing to $CO_2$ production and global warming.

A typical/traditional vapor compression unit based air conditioning unit essentially consists of an evaporator component 4, an electric compressor 1 and a condenser component 2. Both the evaporator unit 4 and the condenser unit 2 can be provided with respective fans 7 and 8 for ensuring input of air therein. In the case of the condenser unit 2, when provided as an air-cooled condenser, the condenser fan 7 inputs ambient (outside) air 9 in and expels warm air out 10. In the case where an air cooled evaporator is provided, the evaporator unit 4 has an evaporator fan 8 to draw in room warm return air 11 and ensure expulsion of cool/chilled air 12 to the space to be cooled. A suction line 13 is provided connecting the evaporator 4 to the condenser 2 through an electric compressor 1. The function of the suction line 13 is to transport the refrigerant back to the condenser unit 2. The condensed refrigerant is recirculated to the evaporator unit 4 from the condenser unit 2 through a liquid flow line 15 provided with an expansion valve 6 or a device or a means that reduces the refrigerant pressure and controls the amount of refrigerant flow into the evaporator 4, thereby controlling the superheating at the outlet of the evaporator 4. The functioning of this prior art system is explained below. The significant feature of this system is that it is unitary, in that both the condenser component 2 and evaporator component 4 are provided in the same housing 17.

In a typical vapor compression refrigeration cycle, the electrical compressor 1 compresses the refrigerants gas to an elevated pressure which moves on to the condenser section 2. In the condenser 2, the compressed gas liquefies on cooling as the heat of compression is extracted by cooling means dependent of ambient air 9 or cooling water. The liquefied refrigerant gas than moves on to a throttling device, referred to as an expansion valve 6 or capillary, or orifice, where the pressure is reduced and temperature lowered. The liquid to gas phase change takes place in the heat exchanger 5 referred to as the evaporator 4. This latent heat of vaporization is given off as a cooling effect to a fluid which is cooled in coming contact with the evaporator heat exchanger 5. This vapor in a gaseous form travels to the compressor 1 and is again compressed, repeating the cycle.

Figure 2:
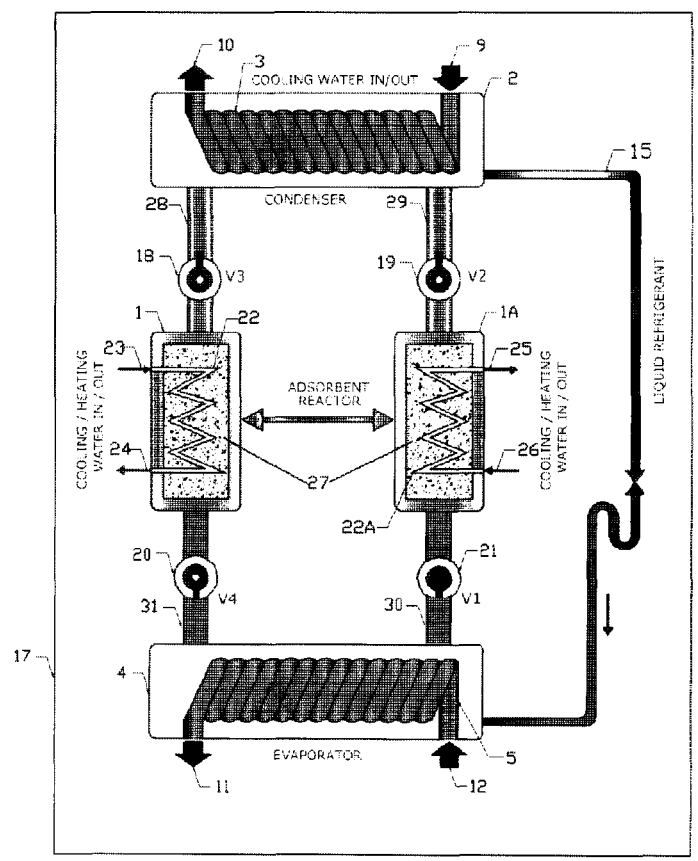
FIG. 2 is a depiction of prior art typical adsorption cooling/air conditioning unit.

FIG. 2 is a schematic depiction of a prior art adsorption based cooling/air conditioning unit. In the adsorption cooling system/unit, the electric compressor of a vapor compression based unit is substituted by a thermal compressor comprising of two or more alternating adsorber beds 1 and 1A. These adsorber beds 1 and 1A are filled with various types of adsorbents 27 coming from a family of silica gel, zeolites, molecular sieve, activated carbon, MOFs, COFs, FAMs, and other new types of adsorbents under development.

As can be seen in FIG. 2, thermal compression based air conditioning unit essentially consists of an evaporator component 4, a compressor component consisting of two alternating adsorbent reactors 1 and 1A, and a condenser component 2. The condenser unit 2 utilizes a cooling fluid such as water 9 circulating through a cooling means therein which is introduced through an and ejected through an outlet 10. The evaporator unit 4 is connected to the condenser unit 2 through two separate lines each running through an independent adsorbent reactor. The two adsorbent reactors 1 and 1A are each provided with respective inlets for cool water 23 and outlets for warm water 24, and function alternatively at a determined time cycle as described hereinbelow. Two way valves 18, 19, 20 and 21 are provided on each line before and after the adsorbent reactors 1 and 1A to ensure no return flow of the used refrigerant to the evaporator unit 4. The condensed refrigerant is returned to the evaporator unit 4 from the condenser unit 2 through a liquid flow line 15 provided typically with a P-trap.

The significant feature of this system is that it is unitary, in that both the compression component/adsorbers land 1A, the condenser component 2, and evaporator component 4 are provided in the same housing 17.

As explained above, adsorption heat exchangers 1 and 1A typically comprise a heat exchanger 22 and 22A structure which is used for supplying and discharging thermal energy and is in a thermal contact with a sorbent material 27 which uses a phase change of an adsorbate working medium for binding and releasing latent heat. Heat is released through the adsorption of a vaporous working medium. Conversely, the thermal energy supplied via the heat exchanger structure 22 and 22A can be used for renewed vaporization of the adsorbate.

Various types of adsorbent reactor 1 and 1A types are known, as are various adsorbent/refrigerant pairs.

In the adsorption type refrigeration unit, the adsorbent and the refrigerant are generally referred to as an adsorbent cum refrigerant pair. Whilst silica gel and water and molecular sieve and water, are the most commonly used pairs as well as green and safe refrigerant pairs, several other refrigerant pairs like zeolite and water, activated carbon and ethanol, activated carbon and propane [4-9] are under usage and investigation, and product development.

In a typical adsorption cooling unit cycle, cooling energy is extracted from the refrigerant evaporation via the mass transfer process from the evaporator 4 to the adsorber bed 1 during adsorption process. This process is normally termed as adsorption-assisted-evaporation. The uptake potential by the unsaturated adsorbent materials initiates the evaporation of the refrigerant in the adsorption process. This is an exothermal process and thus external cooling is required for the rejection of adsorption heat maintaining the adsorption process. Once the adsorbent materials become saturated with the refrigerant or the preset cycle time is reached, they are isolated from the evaporator 4 and are preheated using external heat source increasing the pressure of the system. Once the pressure reaches to the condenser pressure or the pre-set time, the adsorber bed is then commuted to the condenser 2. The continuous heating of the adsorbent resulted in the regeneration process and the desorbed vapor is condensed inside the condenser 2. At the completion of the desorption process, the adsorber is cooled down using external cooling circuit whilst isolating it from the condenser 2. The adsorbent materials undergo the adsorption-evaporation process and the cycle completes. In practical adsorption system, multi-bed approach is adopted to get continuous useful effect where one or a cluster of beds performs adsorption process whilst the other undergo desorption process [10, 11].

Adsorption based systems are driven by the adsorption and desorption of an adsorbate vapor by a porous solid adsorbent 27. In contrast to conventional vapor-compression cooling systems which are driven by a mechanical compressor, no electrical energy is needed to drive the adsorption cycle. The basic cycle involves an adsorption phase and desorption phase. In the adsorption phase, the refrigerant vapor is adsorbed by the adsorbent substance 27 resulting in the release of heat. In the desorption phase, heat is applied to the adsorbent 27 causing desorption of the refrigerant. The heat transferred during these processes is conveyed by a heat exchanger 22 and 22A between the adsorbent 27 and a heat transfer fluid (e.g. water or methanol or a water-glycol mixture) or an external environment. The adsorption and desorption processes occur in conjunction with evaporation and condensation of refrigerant in an evaporator 4/condenser 2. The adsorption of the gaseous refrigerant lowers the vapor pressure, promoting evaporation of the liquid refrigerant in the evaporator 4. During this evaporation, heat is extracted from an environment to be cooled, resulting in refrigeration. By supplying heat to the adsorbent 27 via the heat exchanger 22 and 22A, the adsorbed refrigerant is released into the vapor phase, thus regenerating the adsorbent material 27 for the next adsorption cycle. The resulting gaseous adsorbate passes to a condenser 2 where heat rejection to the environment takes place. As in conventional vapor-compression cooling, the liquid refrigerant is passed through a concentric syphon, or a P trap or the like back into the evaporator 4, and the cycle can then be repeated.

Figure 3:
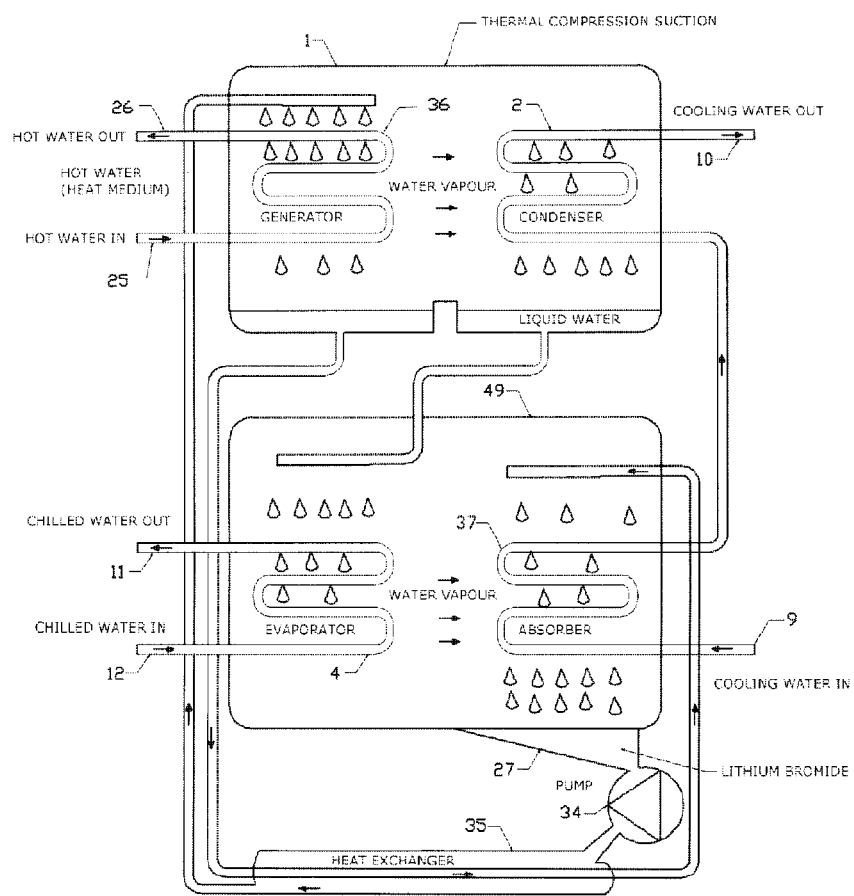
FIG. 3 is a depiction of a prior art typical absorption cooling/air conditioning unit.

FIG. 3 is a schematic depiction of an absorption based cooling system. As is shown therein, in the absorption cooling unit, the electric compressor is substituted by a thermal compressor/section 1, but based on the principal of absorption. The adsorbent pairs used in a typical absorption unit are water+lithium bromide 27 or ammonia+water, both considered both highly toxic and corrosive.

In the typical absorption chiller (cooling) unit, the evaporator 4 is provided proximate to the absorber section 49. The evaporator unit 4 has an inlet 12 and an outlet 11 for chilled water. The absorber unit comprises an absorber bed 37 with a line in 9 for flow of cooling water which then leads to the condenser unit 2. The condenser unit 2 has an outlet 10 for cooling water. A generator 36 is provided proximate to the condenser 2 and provided with inlet means 25 and outlet means 26 for hot fluid. A heat exchange means is provided in operative association with the evaporator 4 and the absorber section 49.

Figure 4A:
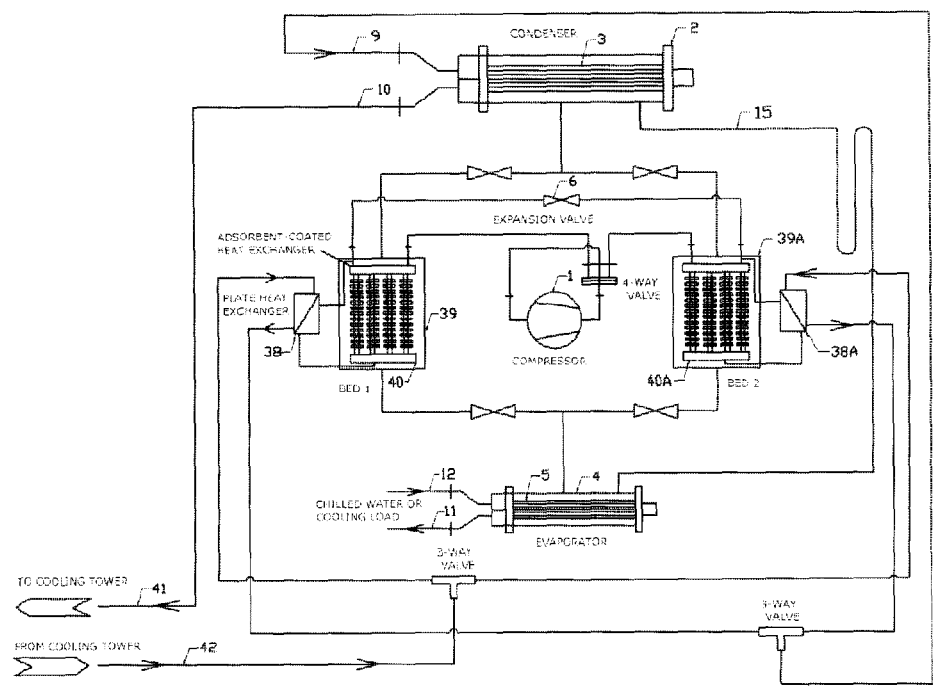
FIGS. 4A and 4B are schematic depictions of a hybrid vapor compression/adsorption cooling/air conditioning unit.
Figure 4B:
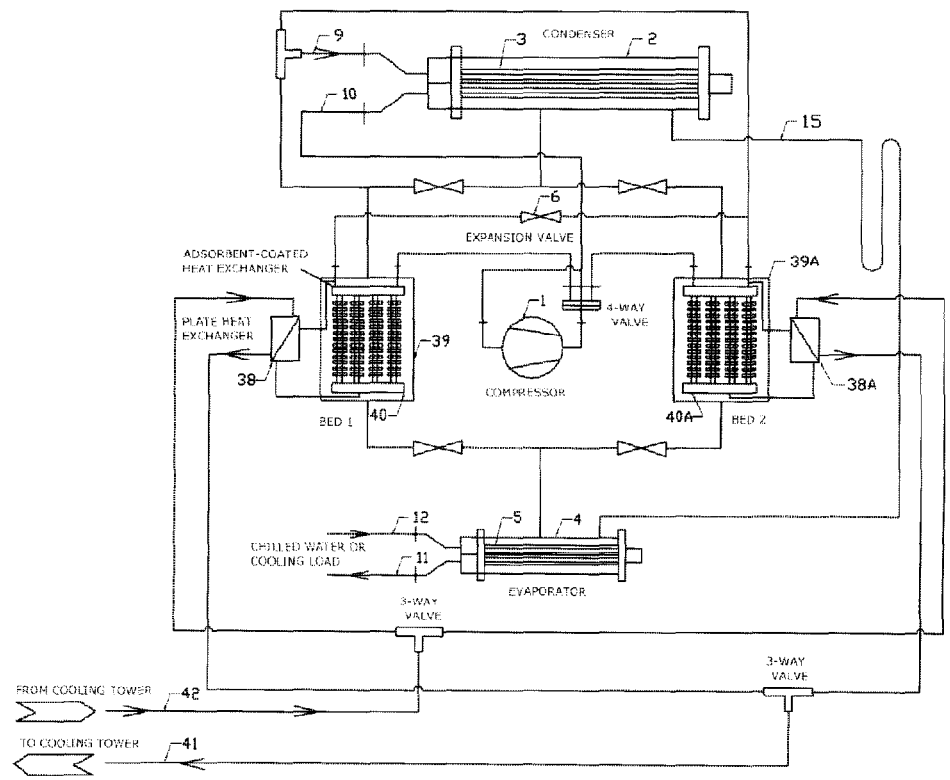

FIGS. 4A & 4B are schematic depictions of a hybrid vapor compression/adsorption cooling/air conditioning unit, which are proprietary to the applicants herein, and are disclosed in co-pending Indian Patent application 2154/DEL/2015, whose disclosure is deemed included herein by reference, for the sake of brevity.

In particular, FIG. 4A encompasses a device wherein heat from the adsorption bed of the adsorption cycle is pumped to the desorption bed using the compression cycle. In other words, the evaporation process of the vapor compression cycle is utilized to maintain the adsorption process which is an exothermic process. The condensation heat from the adsorption cycle and the energy from the vapor compression cycle i.e., the compression energy can be rejected to ambient through a water- or air-cooled heat exchanger.

In FIG. 4B, heat from both the adsorber bed 39 and the condenser 2 is pumped to desorber bed 39A. The excess energy i.e., the evaporation energy of the adsorption cycle and compressor 1 power of the MVC cycle is rejected at the desorber 39A and to an external cooling devices by further cooling down the refrigerant that comes out from the desorber bed 39A.

Figure 4C:
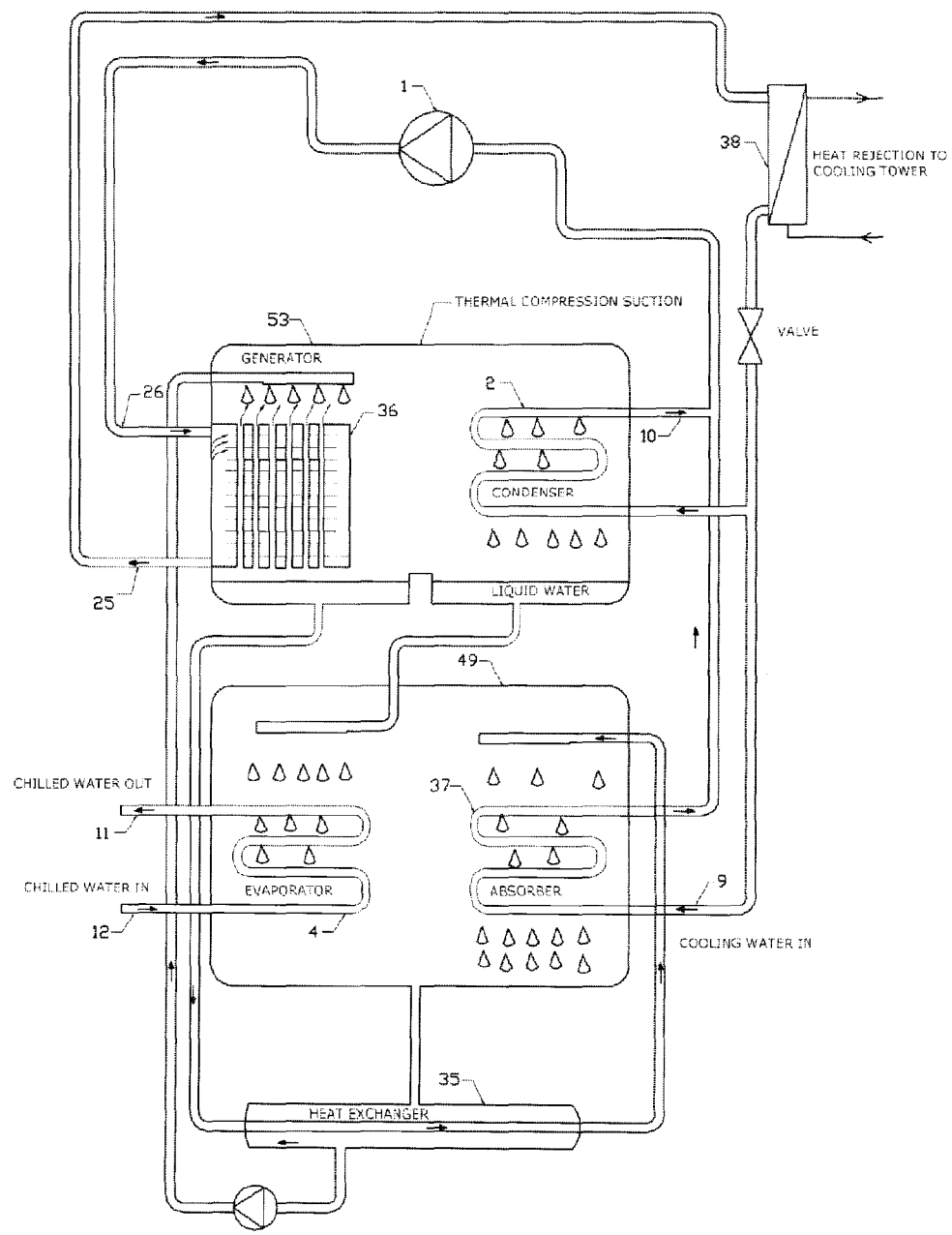
FIG. 4C is a schematic depiction of a hybrid vapor compression/absorption cooling/air conditioning unit.

In both configurations, cooling energy is extracted from the evaporator 4 of the adsorption cycle whilst the condensation heat of the adsorption cycle and the compressor 1 work is rejected at the heat rejection devices such as cooling tower FIG. 4C is a schematic depiction of a hybrid vapor compression/absorbent system, which are proprietary to the applicants herein, and are disclosed in co-pending Indian Patent application 2154/DEL/2015, whose disclose is deemed include herein by reference for the sake of brevity. The evaporator 4 is provided proximate to the absorber section 49. The evaporator unit 4 has an inlet 12 and an outlet 11 for chilled water. The absorber unit comprises an absorber bed 37 with a line in 9 for flow of cooling water which then leads to the condenser unit 2. The condenser unit 2 has an outlet 10 for cooling water. A generator 36 is provided proximate to the condenser 2 and provided with inlet means 25 and outlet means 26 for hot fluid. A heat exchange means 35 is provided in operative association with the evaporator 4 and the absorber section 49. As can be seen the entire system is unitary, i.e. it is provided in a single unitary housing. The evaporation process of the vapor compression cycle is utilized to maintain the absorption process. The condensation heat from the absorption cycle and the energy from the vapor compression cycle i.e., the compression energy can be rejected to ambient through a water- or air-cooled heat exchanger.

Figure 5:
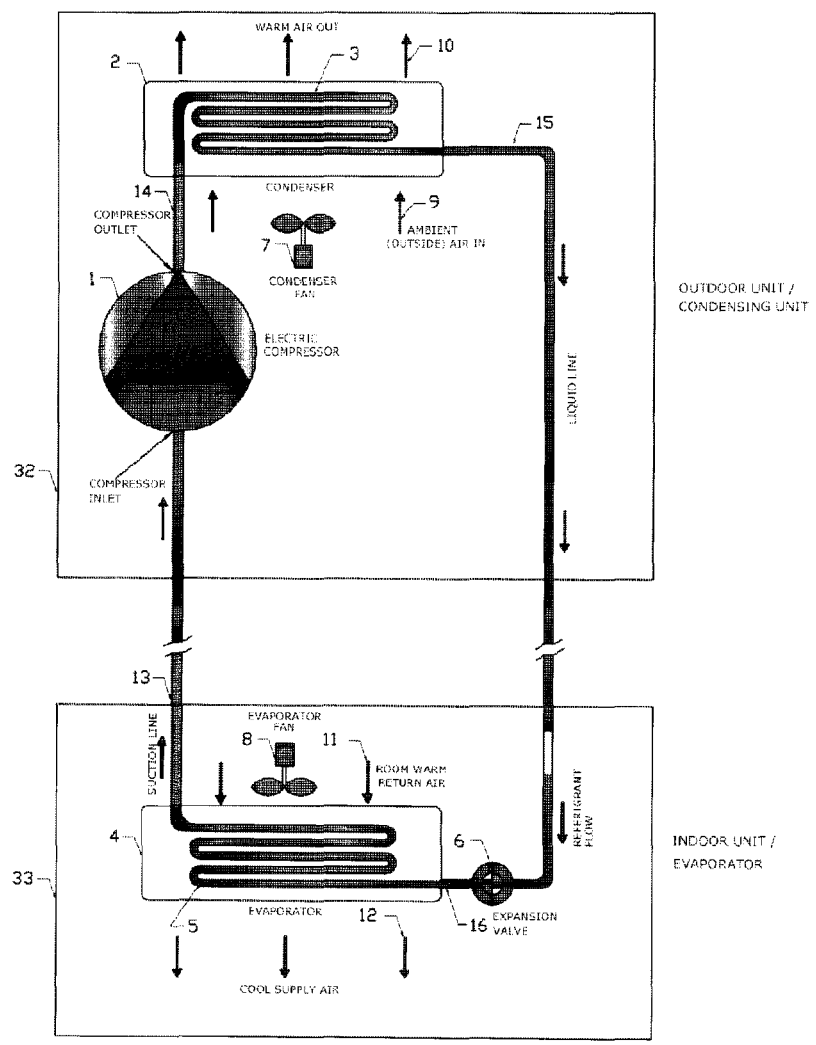
FIG. 5 is a schematic depiction of a typical split vapor compression cooling/air conditioning unit.

FIG. 5 is a schematic depiction of a typical split vapor compression cooling/air conditioning unit. The fundamental distinction between the device of FIG. 5 and the device of FIG. 1 is that the evaporator unit 4 is kept remote. However, the compression unit remains an electrically driven compressor unit 1 utilizing CFC's and/or synthetic refrigerants. The parts of the device represented in FIG. 5 bear the same reference as the corresponding portions of the device of FIG. 1. The housings for the evaporator unit and the condenser/compressor unit are labeled as 20 and 21 respectively.

While the refrigeration cycle described in FIG. 1 has been known for several years since the invention of the first cooling unit, the usage of an electric compressor 1 based split air-conditioning unit has taken place only over the past 30-40 years, particularly in capacities below 30 kW. In this split type of unit, the evaporator section 4 is housed separately in an indoor unit referenced in FIG. 5.

The present invention essentially resides in isolating geographically the indoor/cooling unit which supplies the cool supply air 12, either wholly or in part, from the condensing unit 32. For example, the scope of the invention includes both separation of the entire cooling unit 33 from the condensing unit 32, and connecting the two through a thermal compressor 1 provided in the same housing as the condenser 2.

Alternatively, it is within the scope of the invention to provide the cooling section as two parts—a direct cooling/indoor/remote unit 33 which supplies cool supply air 12, and which is fed with cooled liquid refrigerant from pseudo evaporator means in the main outdoor unit. This pseudo evaporator can be included in the same housing as the condensing unit 32 comprising the thermal compressor 1 and the condenser 2, or as a separate unit altogether.

FIG. 6 is a block diagram of the broad underlying inventive concept in the device encompassed in this application. As can be seen, cooling/indoor/remote unit 33 is provided as a remote/separate unit but connected functionally with the thermal compressor 1 and then the condenser 2. The compressor unit 32 comprises at least one thermal compressor 1, whether of adsorbent type or absorbent type. The dashed box lines 32 surrounding the condenser 2 and compressor 1 units denote that both units are generally in one housing, but can also be provided in separate housings. The cooling/indoor/remote unit 33 essentially comprises the cooling portion which assists in the delivery of cool air 12 to the space to be cooled. This unit may include evaporator 4 tubes in one of the embodiments. Alternatively, the cooling portion can be provided remote from the pseudo evaporator unit 48. The pseudo evaporator 48 is depicted through a dotted circle.

FIG. 7a is one schematic depiction of the device of the invention wherein the split indoor/cooling/remote unit 33 is geographically isolated from the condensing unit 32 in a separate housing. While the figure shows the condenser 2 and the adsorbent reactors 1 and 1A in the same housing, it must be understood that they can also be isolated/remote from each other. Essentially, the liquid refrigerant is supplied to the split indoor/cooling/remote unit 4 from the condenser unit 2 through an independent line 15. Generally, a P trap or a concentric syphon or the like is included. The split remote/cooling/indoor unit 33 is supplied with room return warm air 11 through a fan 8. The split cooling/remote/indoor unit 33 chills/cools the room return warm air 11 and converts it to supply air 12 for the space to be cooled. The refrigerant is returned back to the condenser 2 through a thermal compression unit having two or more adsorbers 1 and 1A working in pre-determined time cycles.

Each adsorber 1 and 1A is provided with an inlet for cooling water 23/26 and an outlet for warm water 24/25. The two adsorbers work in tandem time cycles which are pre-determined as discussed below. Each adsorber/thermal adsorber/thermal compressor is provided with dedicated non-return type valves 18, 19, 20 and 21 to transport the refrigerant received from the evaporator 4 to the condenser unit 2.

As stated above, in the device of the invention, the compressor unit used in prior art mechanical refrigerant systems is replaced by a dual pair of thermal compressor units 1 and 1A. Unlike a compressor which runs continuously, the two adsorbers work alternatively to a given cycle time, say 3~15 minutes. Another advantage of the present split level system is that the two adsorbent reactors 1 and 1A, the condenser 2 and the evaporator 4 unit are not housed in a single casing—and are actually provided in separate housings along with non-return valves 18, 19, 20 and 21. The working pair can be silica gel/zeolite/MOF/COF/FAM (adsorbent)+water (refrigerant), both being very inert and environmentally friendly. With the above working pair, the machine operates under a vacuum between 6,000 (6.0 TORR) micron and 50,000 (50 TORR) micron, depending upon the operating design parameters.

In this adsorption based refrigerant cycle, the chilled water to be cooled provides the heat to the refrigerant to boil off and vaporize driving it towards the adsorber through the interconnecting valve V4/21 or V1/21, depending on which adsorber is undergoing adsorption process. The refrigerant on evaporation cools the incoming water to provide outgoing chilled water. The vapor (adsorbate) continues to be adsorbed in the adsorbent in the adsorber heat exchanger 22. Nearing useful working capacity, the adsorber cycle is completed. During this period cooling water is provided into the adsorber heat exchanger 22 so as to extract and take away the heat generated during adsorption. At the end of the cycle, the valve 20 between the split indoor/cooling/remote unit 4 and adsorber 1 is closed and the valve 19 between adsorber 1A and condenser 2 is open, and hot water flows through the adsorber heat exchanger 22A to provide the heat for desorption of the adsorbate from the adsorbent 27, driving it to the condenser 2.

Hot refrigerant, as vapor, under pressure enters the condenser 2 where external cooling water extracts the heat thereby liquefying the refrigerant and having it flow by gravity to the evaporator 4 on a continuous basis. At the end of the adsorption cycle, the next adsorber comes into play becoming now the adsorber, just as explained earlier; after completion of the adsorption cycle the adsorber switches its mode and become the desorber. The cycle time, between 3~15 minutes, will depend upon the heat exchanger, the kinetics of the adsorbate onto the adsorbent, the temperature of the regenerating hot water, and the type of adsorbent used, and the cooling water temperature.

The devices depicted in FIG. 7a(*i*), (*ii*) and (*iii*) differ mainly in the type, design, and construction of the evaporator The vacuum type evaporator houses a special falling film evaporator heat exchanger providing an efficient means of evaporating the liquid refrigerant water, under vacuum, to gas phase. The falling film evaporator 5, as shown is only one example, and other types of heat exchangers for evaporation can also be applied. Typically, in the evaporator 5 under review, water in vapor form is returned to the main unit at approximately 5-7° C.

Combined with the evaporator unit 5 is a P-trap which prevents the vaporized gas from pushing back the liquid to the condenser 2 of the main unit. In the evaporator 5, the evaporator tubes through which the refrigerant is flowing, falling, and getting vaporized are shown as vertical. However, this is not essential or mandatory, and horizontal or inclined tubes can also be configured. In either case, usage is generally made of extended fins for enhanced tube surface for more efficient heat exchange with air flow to be cooled. The evaporator 5 as shown has a refrigerant sump and a small liquid pump 44 to circulate and spray the refrigerant for flow into the tubes.

In another embodiment of the invention depicted in FIG. 7b, the compression means, along with the condenser means can be segregated, thereby isolating just the split indoor/remote/cooling unit 33 into an indoor unit for supply of air 12 to the space to be cooled. These embodiments/components are described in detail below and referred to as:

(a) split remote/indoor/cooling unit 33 fed with cooled liquid refrigerant from main adsorption unit, and (b) main adsorption unit 32 comprising thermal compressor 1 and 1A, condenser 2 and pseudo evaporator 48.

The adsorber unit can utilize any known adsorbent-refrigerant pairs. The following working principle is with reference to a silica gel-water pair since this is most commonly and prominently used. In case of the silica gel-water pair the pseudo evaporator has to operate under negative pressure.

The split indoor/cooling/remote unit 33 depicted schematically in FIGS. 7a(*i*), 7a(*ii*), 7a(*iii*) and 7b describe the configuration for a one-ton remote unit, with the main unit also having a cooling capacity of 1 RT (3.5 kW). Since water has a very high latent heat of vaporization, the liquid line from the main unit to the split cooling/remote/indoor unit 33 is designed to be small in diameter, at a temperature of approximately 30-35° C.

In FIG. 7b the fan coil unit 33, which is remote is fed with liquid (water) refrigerant, from the main adsorption unit which is remote or outdoor. The indoor unit 32, as shown, is complete with extended fin type heat exchanger, air filter and blower along with motor and condensate drain pan. For this type of indoor unit, cold refrigerant liquid water (chilled water), say at 7° C. and the liquid water after the heat exchanger, say at 12° C. is returned to the main unit into a pseudo evaporator 48 from which the heat exchanger tubes have been taken out altogether. As shown in FIG. 7b, the main unit traditional evaporation section from where the tubes have been removed is replaced/substituted/occupied by a cooling tower fill type arrangement, or any other equivalent suitable arrangement to continuously generate low temperature water liquid at approximately 7° C. to the split remote/indoor/cooling unit 33. The return water at approximately 12° C., along with the return condensate from the condenser 2, is continuously supplied on to the pseudo evaporator 48. In the case of this cooling unit, typically for 1 RT, the liquid line from the main unit sump will need to carry liquid water at 2.4 USGPM at approximately 7° C. and the typical return water temperature to the unit will be approximately 12° C.

FIG. 8a is a depiction of the application of the 'split' concept of the invention to an absorption chiller system. Unlike the typical absorption chiller (cooling) unit where the evaporator 4 is provided proximate to the absorber section 49, in the present invention, the split indoor/remote/cooling section 33 is segregated and provided in an independent housing 33. The split cooling/indoor/remote unit 33 is functionally connected with the main housing containing the absorber unit 49 and the heat exchanger 35. A separate line conveys the refrigerant liquid from the condenser unit 2 to the split remote/indoor/cooling unit 33. The warmed up vaporized refrigerant is conveyed out to the absorber unit. Cool supply air 12 is provided to the room by means of an evaporator fan 8 provided in the evaporator housing 33.

The construction of the condenser 2, generator 36, absorber section 49 and heat exchanger section 35 can remain the same as in the art. The absorber unit comprises an absorber bed 37 with a line in for flow of used refrigerant from the indoor/remote/cooling unit 33, which is then fed to the condenser unit 2. The condenser unit 2 has an outlet 10 for cooling water. A generator 36 is provided proximate to the condenser 2 and provided with means to inlet 25 and outlet 26 the hot fluid. A heat exchange means 35 is provided in operative association with the evaporator 4 and the absorber section 49.

The devices depicted in FIG. 8a(i), (ii) and (iii) differ mainly in the type, design, and construction of the evaporator.

FIG. 8b is a depiction of an absorber based system wherein the pseudo evaporator 48 concept is utilized. As earlier, the evaporator means 5 and the split indoor/remote/cooling section 4 are kept remote from each other. The evaporation and chilling function is carried out at one level at the heat exchange tube unit 5. The chilled refrigerant liquid is introduced from this unit to the evaporator/cooling section 4, utilized for chilling the room warm return air 11 and dispelling cool supply air 12 to the space to be cooled. The used refrigerant fluid is then recycled back to the pseudo evaporator unit 48. The liquid portion is returned to the sump of the pseudo evaporator 48. The vaporized portion of the refrigerant is conveyed to the condenser section 1 wherein it is condensed, and then recycled for use back to the pseudo evaporator 48.

Turning now to FIGS. 9a and 10a, they depict alternative mechanisms for a split hybrid vapor compression/adsorption system. FIG. 9a depicts a system wherein heat from the adsorption bed 39 of the adsorption cycle is pumped to the desorber bed 39A using the compression cycle. In other words, the evaporation process of vapor compression cycle is utilized to maintain the adsorption process which is an exothermic process. Condensation heat from adsorption cycle and energy from the vapor compression cycle i.e., the compression energy can be rejected to ambient through a water- or air-cooled heat exchanger 38.

In FIG. 10a, heat from both the adsorber bed 39 and the condenser 2 is pumped to desorber bed 39A. The excess energy i.e., the evaporation energy of the adsorption cycle and compressor power of the MVC cycle is rejected at the desorber 39A and to an external cooling device by further cooling down the refrigerant that comes out from the desorber bed 39A.

In both configurations, cooling energy is extracted from the evaporator 4 of the adsorption cycle whilst the condensation heat of the adsorption cycle and the compressor 1 work is rejected at the heat rejection devices such as cooling tower.

The condensation process of the vapor compression cycle provides the heat source for the regeneration process of the adsorption cycle working in desorption mode. Thus, the combined cycle essentially eliminates the cooling and heating circuits to the adsorber beds 39 and 39A of a conventional adsorption cycle and the system becomes significantly compact, portable and operational by electrically-driven compressor 1. The method of cooling and heating for adsorption, condensation and regeneration of adsorption cycle is applicable to any kind of adsorbent+adsorbate pairs.

The combined cycle discussed hereinabove provides superior coefficient of performance (COP) as compared to either conventional vapor compression cycle or adsorption cycle. The switching between the adsorber beds 39 and 39A for the evaporation and the condensation of the vapor compression cycle is achieved using a 4-way valve 50 whilst a 3-way valve 51 is used for the rejection of the condensation energy from the adsorption cycle as depicted in FIG. 2.

The split hybrid vapor compression/adsorption system adsorption cycles can range from two adsorber beds 39 and 39A to multi-bed systems such as 3-bed or 4-bed. For multi-bed scenarios, the refrigerant for the cooling and heating can be distributed to the adsorber beds 39 and 39A accordingly, thus realizing adsorption and desorption processes.

Various material pairs (water-silica gel, water-zeolite etc.) can be used in the adsorption cycle, which typically operates in vacuum and is independent from the vapor compression cycle. This adsorption cycle system solely uses the heat from the condenser which otherwise is rejected to the ambient. Refrigerant fluids never mix to each other. The vapor compression system is utilized for cooling the adsorber bed and heating the desorber bed completely, thereby eliminating external cooling and heating for the adsorbers. Cooling load is extracted from the evaporator 4 of the adsorption cycle. The evaporation temperature of the MVC cycle is raised to adsorption temperature whilst condenser 2 of the refrigeration occurs at desorption temperature. The system has two separate refrigerant circuits namely one for adsorption cycle and the other the MVC cycle.

As can be seen the embodiments of FIGS. 9a and 10a differ essentially in that in the latter heat from both the adsorption bed and the condenser 2 are pumped to the desorption bed 39A, whereas in the former, only the heat from the adsorption bed 39 is pumped. In both sub-embodiments, the split indoor/remote/cooling section 4 is remote and housed separately from the other components of the system. The split indoor/cooling/remote unit 4 is operatively connected to the heat exchangers 38 and 38A for return of refrigerant gas and to the condenser 2 for inlet of refrigerant fluid 15.

FIGS. 9a(i), 9a(ii) and 9a(iii) are further depictions of the device of FIG. 9a wherein different types of evaporators 4 are utilized. FIG. 9b is a depiction of a 'split' hybrid vapor compression/adsorbent system wherein the split remote/indoor/cooling unit 4 is remote from the pseudo evaporator means. The pseudo evaporator tubes are provided distant from the split remote/indoor/cooling unit and can be integral or separate from the main/outdoor unit containing the condenser unit 2 and the compression systems. The refrigerant gas is outlet from the split indoor/remote/cooling unit into pseudo-evaporator 48 component unit, and therefrom into compression system. This is then sent on to the condenser 2, and then returned back to the pseudo evaporator means for chilling and onward transmission into the split indoor/cooling/remote unit in the form of cooled refrigerant liquid 15. FIGS. 10a(i), 10a(ii) and 10a(iii) are further depictions of the device of FIG. 10a wherein different types of evaporators are utilized.

FIG. 10b is a depiction of a 'split' hybrid vapor compression/adsorbent system wherein the split remote/indoor/cooling unit 4 is remote from the pseudo evaporator means. The pseudo evaporator tubes are provided distant from the split remote/indoor/cooling unit and can be integral or separate from the main/outdoor unit containing the condenser unit 2 and the compression systems. The refrigerant gas is outlet from the split indoor/remote/cooling unit into the pseudo-evaporator 48 component unit, and therefrom into the compression system. This is then sent on to the condenser 2, and then returned back to the pseudo evaporator means for chilling and onward transmission into the split indoor/cooling/remote unit in the form of cooled refrigerant liquid 15.

FIG. 11a is a depiction of the application of the 'split' concept of the invention to a hybrid vapor compression/absorption chiller system. Unlike the typical absorption chiller (cooling) unit where the evaporator 4 is provided proximate to the absorber section 49, in the present invention, the split indoor/remote/cooling section 33 is segregated and provided in an independent housing 33. The split cooling/indoor/remote unit 33 is functionally connected with the main housing containing the absorber unit 49 and the heat exchanger 35. A separate line conveys the refrigerant liquid from the condenser unit 2 to the split remote/indoor/cooling unit 33. The warmed up and partially vaporized refrigerant is conveyed out to the absorber unit 33. Cool supply air 12 is provided to the room by means of an evaporator fan 8 provided in the evaporator housing 33. The evaporation process of the vapor compression cycle is utilized to maintain the absorption process. Condensation heat from the absorption cycle and energy from the vapor compression cycle i.e., the compression energy can be rejected to ambient through a water- or air-cooled heat exchanger.

The construction of the condenser 2, generator 36, absorber section 49 and heat exchanger section 35 can remain the same as in the art. The absorber unit comprises an absorber bed 37 with a line in for flow of used refrigerant from the indoor/remote/cooling unit 33, which is then fed to the condenser unit 2. The condenser unit 2 has an outlet 10 for cooling water. A generator 36 is provided proximate to the condenser 2 and provided with means to inlet 25 and outlet 26 hot fluid. A heat exchange means 35 is provided in operative association with the evaporator 4 and the absorber section 49.

FIGS. 11a(i), 11a(ii) and 11a(iii) are further depictions of the device of FIG. 11a wherein different types of evaporators are utilized. FIG. 11b is a depiction of a 'split' hybrid vapor compression/absorbent system wherein the split remote/indoor/cooling unit 4 is remote from the pseudo evaporator means. The pseudo evaporator tubes are provided distant from the split remote/indoor/cooling unit and can be integral or separate from the main/outdoor unit containing condenser unit 2 and compression systems. The refrigerant fluid is outlet from the split indoor/remote/cooling unit into pseudo-evaporator 48 component unit, and therefrom into the compression system. This is then sent on to the condenser 2, and then returned back to pseudo evaporator means for chilling and onward transmission into the split indoor/cooling/remote unit in the form of cooled refrigerant liquid 15.

Extensive work is globally under way to shrink the size of the thermal compressor i.e. the adsorber combining advanced "materials" with special heat exchanger providing improved kinetics, shorter cycle time, and highly improved cooling capacity per unit volume of heat exchanger. All this has made possible to use adsorption cooling units for mobile transportation. The remote cooling methods described in the invention can easily be used for such mobile transport equipment.

Several advancements for improved COP (coefficient of performance) are under way using hybrid vapor electric compression units along with adsorption/absorption units. Since in all such cases there is a common type of evaporator section, this evaporator section can also be converted into a remote, split, indoor cooling unit as already described above, in both and additional ways.

The adsorption heat exchanger forms a critical part of the device. This component and its specific cooling output is significantly influenced by the adsorbent, referred to as "material" and the way it is joined in relationship to the heat exchanger, the combination influencing the kinetics, the cycle time, and the overall specific cooling power per volume of the adsorber.

The material used can be either silica gel/molecular sieves, MOF, FAMs, COFs, etc. The adsorber heat exchanger essentially comprises of two main items: the basic tube fin or enhanced surface heat exchanger+the adsorbent ("material"). The combination of these two improves the specific cooling power per liter of the adsorber heat exchanger. Several advancements are underway using new materials, new adsorbent (material) adhering methods to improve the thermal conductivity and kinetics, etc.

Adsorbents used can be either physical adsorbents, chemical adsorbents, or composite adsorbents. Physical adsorbents that are usable include materials with differing pore sizes such mesoporous silicates, zeolites, metalloalumino phosphates, porous carbons and metal organic frameworks. Mesoporous silicates include materials such as synthetic amorphous silica gel that have a rigid and continuous net of colloidal silica connected to small grains of hydrated $SiO_4$. Porous carbons include activated carbons obtained by gasifying char with an oxidizing agent. Zeolites include crystalline microporous alumina silicate materials and include several ranges such as HZSM-5, ZSM5, zeolite HY etc. The advantages of zeolite or zeolite based materials are their diversity of uses, and their susceptibility to modification dependent on the purpose of use. Metal organic frameworks are a new generation of materials which are microporous, have high porosity, uniform pore size and have well defined adsorption sites and large surface area. These frameworks typically comprise of organic linkers which connect metal centres.

Chemical adsorbents include metal chlorides such as calcium chloride, barium chloride, strontium chloride etc., salt and metal hydrides such as lithium hydride, calcium hydride, high polymerized hydrides of covalent nature, and non-metal molecular hydrides, and metal oxides.

Composite adsorbents include combinations of chemical and physical adsorbents such as combinations of metal chloride and activated carbon fibres, expanded graphite, silica gel, or zeolite. Composite adsorbents provide an advantage in enhancement of performance of physical adsorbents without incurring the effect of chemical adsorbents such as swelling, poor conductivity, or agglomeration.

The heat exchangers used can be two-bed type or three-bed type and can utilize either coated fins or a granular bed approach or a combination thereof. For purpose of brevity, the description of co-pending patent application 81/DEL/2014 filed on Jan. 10, 2014 is incorporated herein by reference. This co-pending application relates to a novel hybrid adsorption heat exchanger device with enhanced specific cooling capacity. This device with all its modifications can be utilized in the split adsorption air conditioning unit of the invention.

The device of the invention is reasonably believed to provide several distinct advantages over prior art systems. These are summarized below:
1. Regeneration temperature as low as 50° C. (typically below 100° C.).
2. Operational over a wide range of temperature for hot, cooling and chilled.
3. Waste process heat energy/solar energy drives its operation.

4. Low operational costs and maintenance.
5. Extended machine life.
6. Use of water as refrigerant thereby avoiding environmental issues such as global warming potential and ozone layer depletion, additionally avoiding a high carbon emission footprint.
7. No crystallization, corrosion, hazardous leaks, or chemical disposal issues.
8. No vibration or noise and simple and continuous operations.
9. Improved efficiency of the overall cycle by eliminating additional air handling unit (AHU).
10. Lower capital and operational cost by eliminating additional AHU and chilled water circuit.
11. Orientation free sorption system with split-type evaporator.

It is to be understood that modifications and developments to the disclosure provided herein are within the scope of the invention.

REFERENCES

[1] B. B. Saha, A. Chakraborty, I. I. El-Sharkawy, S. Koyama, K. C. Ng, K. Srinivasan, On thermodynamics of advanced adsorption cooling devices, in: 2008 ASME International Mechanical Engineering Congress and Exposition, IMECE 2008, Boston, Mass., 2009, pp. 555-561.
[2] B. B. Saha, I. I. El-Sharkawy, S. Koyama, J. B. Lee, K. Kuwahara, Waste heat driven multi-bed adsorption chiller: Heat exchangers overall thermal conductance on chiller performance, Heat Transfer Eng, 27(5) (2006) 80-87.
[3] K. Thu, K. C. Ng, B. B. Saha, A. Chakraborty, S. Koyama, Operational strategy of adsorption desalination systems, Int. J. Heat Mass Transf., 52(7-8) (2009) 1811-1816.
[4] A. Chakraborty, B. B. Saha, S. Koyama, K. C. Ng, K. Srinivasan, Adsorption thermodynamics of silica gel-water systems, J Chem Eng Data, 54(2) (2009) 448-452.
[5] P. Dutta, P. Kumar, K. C. Ng, S. Srinivasa Murthy, K. Srinivasan, Organic Brayton Cycles with solid sorption thermal compression for low grade heat utilization, Appl Therm Eng, 62(1) (2014) 171-175.
[6] W. S. Loh, I. I. El-Sharkawy, K. C. Ng, B. B. Saha, Adsorption cooling cycles for alternative adsorbent/adsorbate pairs working at partial vacuum and pressurized conditions, Appl Therm Eng, 29(4) (2009) 793-798.
[7] A. B. Ismail, W. S. Loh, K. Thu, K. C. Ng, A study on the kinetics of propane-activated carbon: Theory and experiments, in: 5th International Meeting on Advances of Thermofluids, IMAT 2012, Bintan Island, 2013, pp. 76-82.
[8] I. I. El-Sharkawy, B. B. Saha, S. Koyama, J. He, K. C. Ng, C. Yap, Experimental investigation on activated carbon-ethanol pair for solar powered adsorption cooling applications, Int J Refrig, 31(8) (2008) 1407-1413.
[9] H. T. Chua, K. C. Ng, A. Malek, T. Kashiwagi, A. Akisawa, B. B. Saha, Modeling the performance of two-bed, silica gel-water adsorption chillers, Int J Refrig, 22(3) (1999) 194-204.
[10] K. Thu, Y. D. Kim, A. Myat, A. Chakraborty, K. C. Ng, Performance investigation of advanced adsorption desalination cycle with condenser-evaporator heat recovery scheme, Desalin. Water Treat., 51(1-3) (2013) 150-163.
[11] K. C. Ng, K. Thu, B. B. Saha, A. Chakraborty, Study on a waste heat-driven adsorption cooling cum desalination cycle, Int J Refrig, 35(3) (2012) 685-693.

The invention claimed is:

1. An adsorption/absorption split type air conditioning unit comprising:
a first component comprising (i) one or more compressors, and (ii) a condenser, wherein at least one of said one or more compressors is a thermal compressor operating in a vacuum; and
one or more second component(s), separate and remote from said first component, said one or more second component(s) each being provided in a dedicated housing and comprising an evaporator, wherein the one or more evaporator are selected from a group consisting of: (a) falling film tubular (horizontal/vertical), (b) rising/falling film tubular, (c) forced circulation (tubular/plate), (d) plate-type, (e) falling film plate, and (f) any combination of (a)-(e), with or without enhanced surface treatment for aiding surface evaporation;
each remotely located said one or more second component(s) including said evaporator connected to said at least one of said one or more compressor for adsorption or absorption in the first component through said one or more suction line(s) and one or more liquid line(s);
one or more of said suction line(s) providing discharged refrigerant fluid from each said evaporator through said one or more compressors to said condenser; and
said one or more liquid line(s) conveying refrigerant fluid to each said evaporator from said condenser,
each said evaporator being configured to serve as an air-handler for cooling room air and vaporize the refrigerant to enable an adsorption/absorption split type air conditioning unit function without a chilled water circuit to the evaporator.

2. The adsorption/absorption split type air conditioning unit as in claim 1 wherein the thermal compressors is selected from the group consisting of: (a) an adsorption unit, (b) an absorption unit, (c) a hybrid vapor compression/adsorption unit, and (d) a hybrid vapor compression/absorption unit.

3. The adsorption/absorption split type air conditioning unit as in claim 1 wherein each thermal compressors is an adsorption unit or a hybrid vapor compression/adsorption unit.

4. The adsorption/absorption split type air conditioning unit as in claim 3 wherein an adsorbent used in case of an adsorption unit or hybrid vapor compression/adsorption unit is selected from the group consisting of: (a) zeolites, (b) mesoporous silicates, (c) insoluble metal silicates, (d) silica gel type A, (e) silica gel type RD, (f) silica gel type S2, (g) activated carbon fiber, (h) granular activated carbon, (i) activated alumina, (j) highly porous activated carbon, (k) $Zr_6O_4(OH)_4$ bonded with linkers, (l) MIL-101Cr, (m) metal-organic frameworks, (n) covalent organic frameworks, (o) functional adsorbent materials, alone or in any combination thereof.

5. The adsorption/absorption split type air conditioning unit as in claim 1 wherein the thermal compressor for adsorption or absorption is an absorption unit or a hybrid vapor compression/absorption unit.

6. The adsorption/absorption split type air conditioning unit device as in claim 5 wherein the absorption unit or the hybrid vapor compression/absorption unit is provided with a refrigerant-absorbent mixture selected from the group consisting of: (a) water-lithium bromide, (b) ammonia-water, (c) ammonia-lithium nitrate, (d) ammonia-sodium thiocyanate, or (e) any combination thereof.

7. The adsorption/absorption split type air conditioning unit device as in claim 1 wherein the refrigerant is selected from the group consisting of: (a) water, (b) methane, (c) methanol, (d) ethanol, (e) ammonia, (f) CFCs, (g) HCFCs, and (h) HFCs.

8. The adsorption/absorption split type air conditioning unit device as in claim 1 wherein the one or more liquid line(s) is provided with one or more refrigerant flow control means selected from the group consisting of: (a) different types of throttling valves, (b) expansion valves, (c) capillaries, (d) P-traps, and (e) metering devices.

9. The adsorption/absorption split type air conditioning unit as in claim 1 wherein the adsorption/absorption split type air conditioning unit when containing an adsorption unit or hybrid vapor compression/adsorption unit, is mountable on a vehicular device.

10. The split adsorption/absorption type air conditioning unit as in claim 1 wherein said evaporator includes a cooling unit including evaporator heat exchange tubes which perform a heat exchange/cooling function in a remote cooling unit.

11. A method for split level adsorption refrigeration using said adsorption/absorption split type air conditioning unit as claimed in claim 1 wherein the method comprises:
providing said first component comprising said one or more compressors and said condenser, wherein at least one of said one or more compressors is the thermal compressor operating in a vacuum;
providing said one or more second component(s) separate from said first component, each said one or more second components being provided in a dedicated housing and comprising an evaporator, wherein the evaporator is selected from the group consisting of: (a) falling film tubular (horizontal/vertical), (b) rising/falling film tubular, (c) forced circulation (tubular/plate), (d) plate-type, (e) falling film plate, and (f) any combination of (a)-(e), all with or without enhanced surface treatment for aiding surface evaporation;
connecting each said evaporator to the condenser through said one or more suction line(s) and said one or more liquid line(s) for inlet and outlet of refrigerant fluid;
discharging refrigerant fluid from each said evaporator through said one or more said suction line(s) into said one or more compressor(s) and therethrough to said condenser;
conveying refrigerant fluid through said one or more liquid line(s) to each said evaporator from said condenser.

12. The method as in claim 11 wherein the thermal compressor is selected from the group consisting of an: (a) adsorption unit, (b) an absorption unit, (c) a hybrid vapor compression/adsorption unit, and (d) a hybrid vapor compression/absorption unit.

13. The method as in claim 11 wherein the thermal compressor is an adsorption unit or a hybrid vapor compression/adsorption unit.

14. The method as in claim 13 wherein the adsorbent used in case of an adsorption unit or hybrid vapor compression/adsorption unit is selected from the group consisting of: (a) zeolites, (b) mesoporous silicates, (c) insoluble metal silicates, (d) silica gel type A, (e) silica gel type RD, (f) silica gel type S2, (g) activated carbon fiber, (h) granular activated carbon, (i) activated alumina, (j) highly porous activated carbon, (k) $Zr_6O_4(OH)_4$ bonded with linkers, (l) MIL-101Cr, (m) metal-organic frameworks, (n) covalent organic frameworks, and (o) functional adsorbent materials-alone or in any combination thereof.

15. The method as in claim 11 wherein the thermal compressor is an absorption unit or a hybrid vapor compression/absorption unit.

16. The method as in claim 15 wherein the absorption unit or the hybrid vapor compression/absorption unit is provided with a refrigerant-absorbent mixture selected from the group consisting of: (a) water-lithium bromide, (b) ammonia-water, (c) ammonia-lithium nitrate, (d) ammonia-sodium thiocyanate, and (e) combination thereof.

17. The method as in claim 11 wherein the refrigerant is selected from the group consisting of: (a) water, (b) methane, (c) methanol, (d) ethanol, (e) ammonia, (f) CFCs, (g) HCFCs, (h) HFCs.

18. The method as in claim 11 wherein the liquid line is provided with one or more refrigerant flow control means selected from the group consisting of: (a) throttling valves, (b) expansion valves, (c) capillaries, (d) P-traps, and (e) metering devices.

19. The method as in claim 11 wherein the split type air conditioning unit when containing an adsorption unit or hybrid vapor compression/adsorption unit, is mounted on a vehicular device.

20. The method as in claim 11 wherein a heat exchange/cooling function is carried out in a remote cooling unit where evaporator heat exchange tubes are disposed away from an associated evaporator unit.

* * * * *